United States Patent
Zhou

(10) Patent No.: US 11,405,920 B2
(45) Date of Patent: Aug. 2, 2022

(54) METHOD AND DEVICE FOR TRANSMITTING INFORMATION

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/609,206

(22) PCT Filed: Jun. 16, 2017

(86) PCT No.: PCT/CN2017/088691
§ 371 (c)(1),
(2) Date: Oct. 28, 2019

(87) PCT Pub. No.: WO2018/227569
PCT Pub. Date: Dec. 20, 2018

(65) Prior Publication Data
US 2020/0068553 A1    Feb. 27, 2020

(51) Int. Cl.
*H04W 72/04*    (2009.01)
*H04W 72/12*    (2009.01)

(52) U.S. Cl.
CPC ..... *H04W 72/048* (2013.01); *H04W 72/1273* (2013.01); *H04W 72/1289* (2013.01)

(58) Field of Classification Search
CPC . H04W 72/04; H04W 72/12; H04W 72/0453; H04W 72/48; H04W 72/1273;
(Continued)

(56) References Cited

U.S. PATENT DOCUMENTS

| | | | |
|---|---|---|---|
| 2013/0010716 A1* | 1/2013 | Dinan | H04W 76/15 370/329 |
| 2013/0143502 A1* | 6/2013 | Kazmi | H04W 28/18 455/62 |
| 2016/0192261 A1* | 6/2016 | Wang | H04W 36/0055 370/331 |

FOREIGN PATENT DOCUMENTS

| | | |
|---|---|---|
| CN | 102264139 A | 11/2011 |
| CN | 103906243 A | 7/2014 |

(Continued)

OTHER PUBLICATIONS

India 1st Office Action in Application No. 201927050883, dated May 28, 2021.
(Continued)

*Primary Examiner* — Huy D Vu
*Assistant Examiner* — Robert Ma
(74) *Attorney, Agent, or Firm* — Syncoda LLC; Feng Ma

(57) ABSTRACT

A method for transmitting information includes: determining frequency information about a second carrier for bearing subsequent scheduling data information; determining a current radio frequency support capability of the user equipment; if the frequency of the second carrier exceeds the current radio frequency support capability of the user equipment, sending scheduling information about the second carrier to the user equipment through the first carrier; and continuing to transmit information to the user equipment through the second carrier according to the scheduling information about the second carrier. As such, subsequent scheduling information that may not be received by a user equipment due to a large carrier span can be reduced, thereby avoiding unnecessary retransmission, and saving system resources.

17 Claims, 10 Drawing Sheets

(58) Field of Classification Search
CPC ... H04W 72/128; H04W 74/08; H04W 76/10; H04W 76/15; H04W 36/0055; H04W 28/18
See application file for complete search history.

(56) References Cited

FOREIGN PATENT DOCUMENTS

| | | | |
|---|---|---|---|
| CN | 104955017 A | 9/2015 | |
| CN | 105981458 A | 9/2016 | |
| EP | 3563606 A1 | 11/2019 | |
| WO | 2016049810 A1 | 4/2016 | |
| WO | 2016106671 A | 7/2016 | |

OTHER PUBLICATIONS

CN First Office Action in Application No. 201780000542.0, dated Nov. 11, 2020.
Extended European Search Report in Application No. 17914032.2, dated Dec. 9, 2020.
Samsung: RAN2 impacts from bandwidth part in NR, 3GPP TSG-RAN WG2 NR#98 Meeting, Hangzhou, China, May 15-19, 2017, R2-1704503.
Samsung: DL Resource Allocation Aspects, 3GPP TSG RAN WG1 Meeting #89, Hangzhou, China, May 15-19, 2017, R1-1708017.
Huawei: 3GPP TSG-RAN WG2 Meeting #93bis, Oct. 31, 2016.

\* cited by examiner

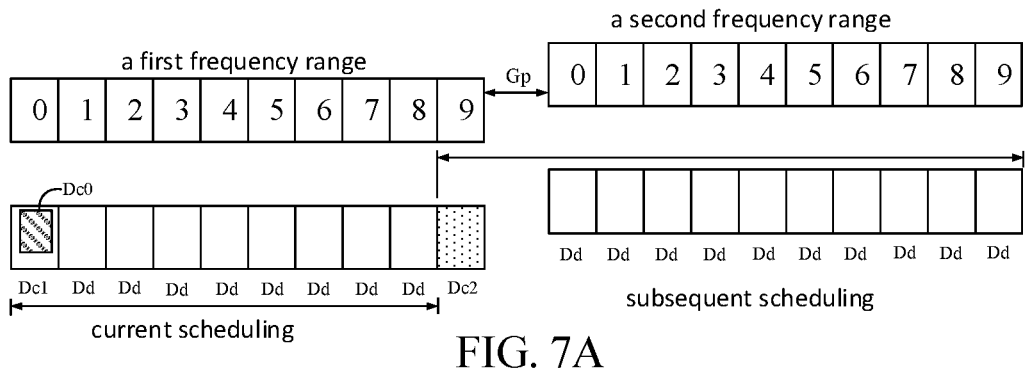

FIG. 7A

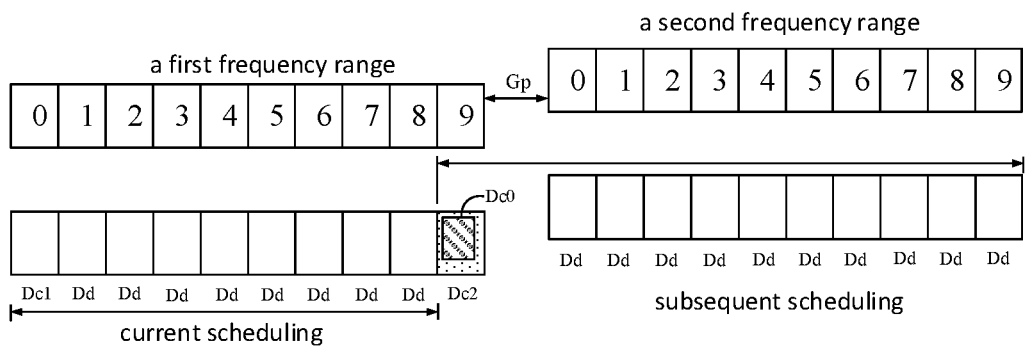

FIG. 7B

```
┌─────────────────────────────────────────────────────┐
│ the scheduling information of the second carrier is │
│ received through a first operating frequency band,  │─ 21
│ wherein the scheduling information of the second    │
│ carrier includes at least: additional scheduling    │
│ information of subsequent scheduling                │
└─────────────────────────────────────────────────────┘
                          │
                          ▼
┌─────────────────────────────────────────────────────┐
│ the first operating frequency band is switched to   │
│ the second operating frequency band according to    │─ 22
│ the additional scheduling information of the        │
│ subsequent scheduling                               │
└─────────────────────────────────────────────────────┘
                          │
                          ▼
┌─────────────────────────────────────────────────────┐
│ the subsequent scheduling information is received   │─ 23
│ through the second operating frequency band         │
└─────────────────────────────────────────────────────┘
```

FIG. 8

METHOD AND DEVICE FOR TRANSMITTING INFORMATION

CROSS-REFERENCE TO RELATED APPLICATION

This application is a national stage of International Application No. PCT/CN2017/088691 filed on Jun. 16, 2017, the disclosure of which is hereby incorporated by reference in its entirety.

TECHNICAL FIELD

The present disclosure relates to the field of communications technologies, and in particular, to a method and a device for transmitting information.

BACKGROUND

With the development of wireless communication technologies, mobile communication networks are gradually evolving to 5G networks. One of the key technologies of a 5G network communication system is that high frequency radio resource (e.g. frequency above 6 GHz) is used for data transmission. In the 5G network, a bandwidth of a single band is close to 1 GHz, and a bandwidth of a single carrier is between 80 MHz and 400 MHz. In an LTE (Long-Term Evolution) system of a 4G network, the bandwidth of the single band generally does not exceed 200 MHz, the bandwidth of the single carrier is between 1.4 MHz and 20 MHz. Thus, the 5G network has higher requirements on the transmission ability of a base station and a user terminal compared to the LTE system of the 4G network.

Due to the limitation of the capability of a radio frequency signal transceiver device in user equipment, the bandwidth of an operating frequency band of the existing user equipment cannot completely match the bandwidth of the single band of the base station close to 1 GHz. In order to meet the large bandwidth scheduling requirements in the 5G network, two or more radio frequency transceiver modules can be set in the user terminal, and respectively work in two or more operating frequency bands with larger frequency span. When the carrier frequency of the downlink signal of the base station is larger, the information can be received by switching the radio frequency transceiver modules.

However, the switching of the radio frequency transceiver modules performed by the user equipment requires time, although the switching delay between modules is shortened to the millisecond level. Since the duration of one sub-frame in the 5G system is 1 ms, the user equipment may miss the reception of part of the downlink information during the switching of the radio frequency transceiver module. If the missed downlink information belongs to the scheduling control information of the subsequent scheduling, the subsequent scheduling data cannot be normally received, which inevitably leads to a lot of unnecessary retransmissions and wastes system resources

SUMMARY

In order to overcome the problems in the related art, embodiments of the present disclosure provide a method and a device for transmitting information, which reduce occurrence of an information loss event due to carrier switching, and avoid unnecessary retransmission.

According to a first aspect of the embodiments of the present disclosure, a method for transmitting information is provided, which is applied to a first device, including:

determining frequency information of a second carrier for bearing subsequent scheduling data information;

determining a current radio frequency support capability of a user equipment;

if frequency of the second carrier exceeds the current radio frequency support capability of the user equipment, sending scheduling information of the second carrier to the user equipment through a first carrier; and continuing to transmit information to the user equipment through the second carrier according to the scheduling information of the second carrier.

Optionally, sending scheduling information of the second carrier to the user equipment through a first carrier includes:

determining additional scheduling information of the subsequent scheduling, wherein, the additional scheduling information of the subsequent scheduling includes: a frequency range of the second carrier, a scheduling time of the second carrier, and a location of scheduling control information of the subsequent scheduling;

sending the additional scheduling information of the subsequent scheduling together with scheduling control information of a current scheduling to the user equipment;

wherein, the current scheduling refers to a scheduling in which data information transmission is bear by the first carrier; and the subsequent scheduling refers to a scheduling in which the data information transmission is bear by the second carrier.

Optionally, sending scheduling information of the second carrier to the user equipment through a first carrier includes:

determining additional scheduling information of the subsequent scheduling, wherein, the additional scheduling information of the subsequent scheduling includes: a frequency range of the second carrier, a scheduling time of the second carrier, and a location of scheduling control information of the subsequent scheduling;

loading the additional scheduling information of the subsequent scheduling into a preset resource of the first carrier;

sending the additional scheduling information of the subsequent scheduling to the user equipment through the first carrier, after the current scheduling is completed.

Optionally, sending scheduling information of the second carrier to the user equipment through a first carrier includes:

determining additional scheduling information of the subsequent scheduling, wherein, the additional scheduling information of the subsequent scheduling includes: a frequency range of the second carrier and a scheduling time of the second carrier;

loading the additional scheduling information of the subsequent scheduling and the scheduling control information into the preset resource of the first carrier; and sending the additional scheduling information of the subsequent scheduling and the scheduling control information to the user equipment through the first carrier Optionally, the scheduling time of the second carrier is an interval duration between the current scheduling and the subsequent scheduling; the current radio frequency support capability of the user equipment is a radio frequency tuning speed of the user equipment;

determining a scheduling time of the second carrier includes:

according to a current operating frequency band of the user equipment and the radio frequency tuning speed of the user equipment, determining a tuning duration required for the user equipment to be tuned from the current operating frequency band to a frequency band corresponding to the second carrier;

determining the scheduling time of the second carrier, according to an end time of the current scheduling and the tuning duration.

Optionally, continuing to transmit information to the user equipment through the second carrier according to the scheduling information of the second carrier includes:

sending the scheduling control information and data information of the subsequent scheduling to the user equipment through the second carrier according to the scheduling time of the second carrier, after the additional scheduling information of the subsequent scheduling and the current scheduling is completed by using the first carrier.

Optionally, continuing to transmit information to the user equipment through the second carrier according to the scheduling information of the second carrier includes:

sending the data information of the subsequent scheduling to the user equipment through the second carrier according to the scheduling time of the second carrier, after the current scheduling, the additional scheduling information for transmitting the subsequent scheduling and the scheduling control information of the subsequent scheduling is completed by using the first carrier.

Optionally, determining a current radio frequency support capability of a user equipment includes:

obtaining information of the current radio frequency support capability of the user equipment, wherein, the information of the current radio frequency support capability includes at least one of the following:

a bandwidth or frequency range of the current operating frequency band of the user equipment;

at least two sensitive frequency points outside the current operating frequency band of the user equipment;

the radio frequency tuning speed of the user equipment.

According to a second aspect of the embodiments of the present disclosure, a method for transmitting information is provided, which is applied to a user equipment, comprising:

receiving scheduling information of a second carrier through a first operating frequency band, wherein the scheduling information of the second carrier includes at least:

additional scheduling information of subsequent scheduling;

switching the first operating frequency band to a second operating frequency band according to the additional scheduling information of the subsequent scheduling;

receiving the subsequent scheduling through the second operating frequency band.

Optionally, the additional scheduling information of the subsequent scheduling is received through the first operating frequency band in any one of the following manners:

obtaining the additional scheduling information of the subsequent scheduling when scheduling control information of the current scheduling is obtained.

obtaining the additional scheduling information of the subsequent scheduling through the first operating frequency band, after reception of the data information of the current scheduling is completed; and receiving the scheduling control information of the subsequent scheduling and the additional scheduling information of the subsequent scheduling through the first operating frequency band, after reception of the data information of the current scheduling is completed.

Optionally, receiving the subsequent scheduling through the second operating frequency band includes:

obtaining the scheduling control information and data information of the subsequent scheduling through the second operating frequency band; or obtaining the data information of the subsequent scheduling through the second operating frequency band.

Optionally, before receiving the scheduling information of the subsequent scheduling through the first operating frequency band, the method further includes:

reporting the information of the radio frequency support capability to a base station, wherein, the information of the current radio frequency support capability includes at least one of the following:

a bandwidth or frequency range of one operating frequency band;

at least two sensitive frequency points outside the operating frequency band;

the radio frequency tuning speed of the user equipment.

According to a third aspect of the embodiments of the present disclosure, a device for transmitting information is provided, provided in a base station which establishes a connection with a user equipment via a first carrier, the device including:

a frequency information determining module, configured to determine frequency information of a second carrier for bearing subsequent scheduling data information;

a capability determining module, configured to determine a current radio frequency support capability of a user equipment;

a carrier information sending module, configured to send scheduling information of the second carrier to the user equipment through a first carrier, in a case where frequency of the second carrier exceeds the current radio frequency support capability of the user equipment; and a data transmitting module, configured to continue to transmit information to the user equipment through the second carrier according to the scheduling information of the second carrier.

Optionally, the carrier information sending module includes:

a first additional information determining sub-module, configured to determine additional scheduling information of the subsequent scheduling, wherein, the additional scheduling information of the subsequent scheduling includes: a frequency range of the second carrier, a scheduling time of the second carrier, and a location of scheduling control information of the subsequent scheduling;

a first information sending sub-module, configured to send the additional scheduling information of the subsequent scheduling together with scheduling control information of a current scheduling to the user equipment;

wherein, the current scheduling refers to a scheduling in which data information transmission is bear by the first carrier; and the subsequent scheduling refers to a scheduling in which the data information transmission is bear by the second carrier.

Optionally, the carrier information sending module includes:

a second additional information determining sub-module, configured to determine additional scheduling information of the subsequent scheduling, wherein, the additional scheduling information of the subsequent scheduling includes: a frequency range of the second carrier, a scheduling time of the second carrier, and a location of scheduling control information of the subsequent scheduling;

a first information loading sub-module, configured to load the additional scheduling information of the subsequent scheduling into a preset resource of the first carrier;

a second information sending sub-module, configured to send the additional scheduling information of the subsequent scheduling to the user equipment through the first carrier, after the current scheduling is completed.

Optionally, the carrier information sending module includes:

a third additional information determining sub-module, configured to determine additional scheduling information of the subsequent scheduling, wherein, the additional scheduling information of the subsequent scheduling includes: a frequency range of the second carrier and a scheduling time of the second carrier;

a second information loading sub-module, configured to load the additional scheduling information of the subsequent scheduling and the scheduling control information into the preset resource of the first carrier; and a third information sending sub-module, configured to send the additional scheduling information of the subsequent scheduling and the scheduling control information to the user equipment through the first carrier.

Optionally, the scheduling time of the second carrier is an interval duration between the current scheduling and the subsequent scheduling; the current radio frequency support capability of the user equipment is a radio frequency tuning speed of the user equipment;

Any one additional information determination sub-module includes:

a tuning duration determining unit, configured to determine a tuning duration required for the user equipment to be tuned from the current operating frequency band to a frequency band corresponding to the second carrier, according to a current operating frequency band of the user equipment and the radio frequency tuning speed of the user equipment;

a scheduling time determining unit, configured to determine the scheduling time of the second carrier, according to an end time of the current scheduling and the tuning duration.

Optionally, the data transmitting module includes:

a first transmitting sub-module, configured to send the scheduling control information and data information of the subsequent scheduling to the user equipment through the second carrier according to the scheduling time of the second carrier, after the additional scheduling information of the subsequent scheduling and the current scheduling is completed by using the first carrier.

Optionally, the data transmitting module includes:

a second transmitting sub-module, configured to send the data information of the subsequent scheduling to the user equipment through the second carrier according to the scheduling time of the second carrier, after the current scheduling, the additional scheduling information for transmitting the subsequent scheduling and the scheduling control information of the subsequent scheduling is completed by using the first carrier.

Optionally, the capability determining module includes:

a capability information obtaining sub-module, configured to obtain information of the current radio frequency support capability of the user equipment, wherein, the information of the current radio frequency support capability includes at least one of the following:

a bandwidth or frequency range of the current operating frequency band of the user equipment;

at least two sensitive frequency points outside the current operating frequency band of the user equipment;

the radio frequency tuning speed of the user equipment.

According to a fourth aspect of the embodiments of the present disclosure, a device for transmitting information is provided, provided in a user equipment, the device including:

a first information receiving module, configured to receive scheduling information of a second carrier through a first operating frequency band, wherein the scheduling information of the second carrier includes at least: additional scheduling information of subsequent scheduling;

a frequency band switching module, configured to switch the first operating frequency band to a second operating frequency band according to the additional scheduling information of the subsequent scheduling; and a second information receiving module, configured to receive the subsequent scheduling through the second operating frequency band.

Optionally, the first information receiving module includes any of the following additional information receiving sub-modules:

a first additional information receiving sub-module, configured to obtain the additional scheduling information of the subsequent scheduling when scheduling control information of the current scheduling is obtained;

a second additional information receiving sub-module, configured to obtain the additional scheduling information of the subsequent scheduling through the first operating frequency band, after reception of the data information of the current scheduling is completed; and a third additional information receiving sub-module, configured to receive the scheduling control information of the subsequent scheduling and the additional scheduling information of the subsequent scheduling through the first operating frequency band, after reception of the data information of the current scheduling is completed.

Optionally, the second information receiving module includes:

a first data receiving sub-module, configured to obtain the scheduling control information and data information of the subsequent scheduling through the second operating frequency band; and a second data receiving sub-module, configured to obtain the data information of the subsequent scheduling through the second operating frequency band.

Optionally, the device further includes:

a capability information reporting module, configured to report the information of the radio frequency support capability to a base station, wherein, the information of the current radio frequency support capability includes at least one of the following:

a bandwidth or frequency range of one operating frequency band;

at least two sensitive frequency points outside the operating frequency band;

the radio frequency tuning speed of the user equipment.

According to a fifth aspect of the embodiments of the present disclosure, a non-transitory computer readable storage medium is provided, computer instructions stored thereon, and when the instructions are executed by a processor, steps of any of the methods described in the first aspect above are achieved.

According to a sixth aspect of the embodiments of the present disclosure, a non-transitory computer readable storage medium is provided, computer instructions stored thereon, and when the instructions are executed by a processor, steps of any of the methods described in the second aspect above are achieved.

According to a seventh aspect of the embodiments of the present disclosure, a device for transmitting information is provided, including:

a processor; and a memory for storing instructions executable for the processor;

wherein the processor is configured to:

determine frequency information of a second carrier for bearing subsequent scheduling data information;

determine a current radio frequency support capability of a user equipment;

if frequency of the second carrier exceeds the current radio frequency support capability of the user equipment, send scheduling information of the second carrier to the user equipment through a first carrier; and continue to transmit information to the user equipment through the second carrier according to the scheduling information of the second carrier.

According to an eighth aspect of the embodiments of the present disclosure, a device for transmitting information is provided, including:

a processor; and a memory for storing instructions executable for the processor;

wherein the processor is configured to:

receive scheduling information of a second carrier through a first operating frequency band, wherein the scheduling information of the second carrier includes at least: additional scheduling information of subsequent scheduling;

switch the first operating frequency band to a second operating frequency band according to the additional scheduling information of the subsequent scheduling; and receive the subsequent scheduling through the second operating frequency band.

The technical solution provided by the embodiment of the present disclosure can include the following beneficial effects:

In the embodiments of the present disclosure, when the base station transmits information to the UE through different carriers with a large frequency span, the method provided by the present disclosure may first notify the user equipment in advance by using the first carrier, when it is determined that the frequency span of the second carrier exceeds the current radio frequency support capability of the UE, so that the user equipment can adjust the operating frequency band in time after receiving the first scheduling information, thereby ensuring that the frequency band conversion is completed before the second carrier arrives, and ensuring successful reception of the subsequent scheduling data, reducing unnecessary retransmission, saving system resources, improving information transmission efficiency and reliability of information transmission.

BRIEF DESCRIPTION OF THE DRAWINGS

The accompanying drawings, which are incorporated in the specification and constitute a part of the specification, show exemplary embodiments of the present disclosure. The drawings along with the specification explain the principles of the present disclosure.

FIG. 7A is a schematic diagram showing another kind of transmission information according to an exemplary embodiment of the present disclosure.

FIG. 7B is a schematic diagram showing another kind of transmission information according to an exemplary embodiment of the present disclosure.

FIG. 8 is a flow chart showing another method for transmitting information according to an exemplary embodiment of the present disclosure.

DETAILED DESCRIPTION

Figure 1:
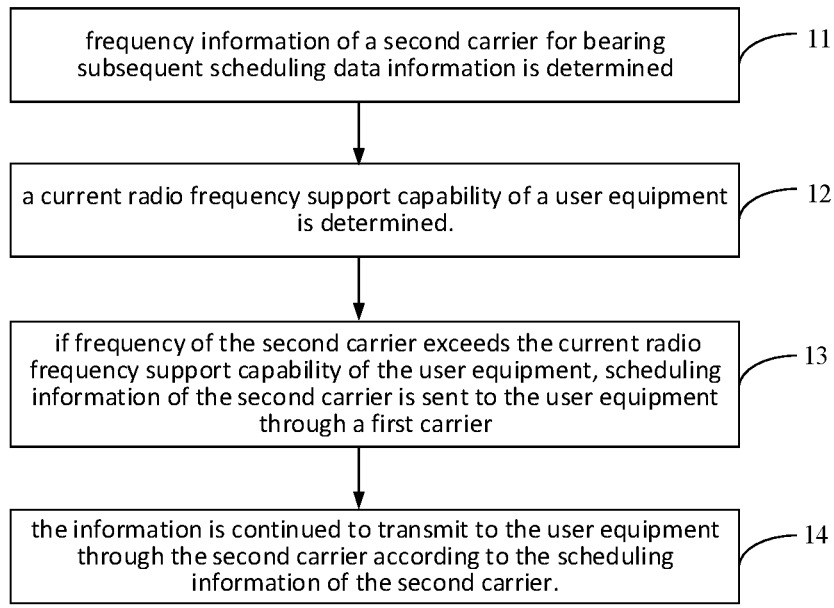
FIG. 1 is a flow chart showing a method for transmitting information according to an exemplary embodiment.

Exemplary embodiments will be described in detail herein, examples of which are illustrated in the accompanying drawings. The following description refers to the same or similar elements in the different figures unless otherwise indicated. The embodiments described in the following exemplary embodiments do not represent all embodiments consistent with the present invention. Instead, they are merely examples of devices and methods consistent with aspects of the invention as detailed in the appended claims.

Execution subjects of the present disclosure include: a base station and a user equipment (User Equipment, UE), wherein the base station may be a base station, a sub base station, or the like provided with a large-scale antenna array. The user equipment UE may be a user terminal, a user node, a mobile terminal, or a tablet. In a specific implementation process, the base station and the user equipment are independent of each other, and are in contact with each other to jointly implement the technical solution provided by the present disclosure.

In the application scenario of the present disclosure, an radio frequency transceiver module in the UE can work in at least two operating frequency bands, and the span of two adjacent operating frequency bands is large to adapt to different types of network communication systems, such as a 4G network and a 5G network, or can work in two carriers with a large frequency span in the same network communication system, such as two carriers with the frequency span of 1 GHz in the 5G network.

Two operating frequency bands are taken as an example; the radio frequency transceiver module works in the first frequency band at the current time; the operating frequency band can be automatically adjusted to the second frequency band at the next time. Alternatively, two radio frequency transceiver modules may be configured in the UE, and each radio frequency transceiver module has a different operating frequency band.

At least one of the above at least two operating frequency bands corresponds to a NR mode in the 5G network. Two radio frequency transceiver modules in one UE taken as an example, the two radio frequency transceiver modules can be divided into a low frequency module and a high frequency module according to the operating frequency band. Wherein, the low frequency module may be a radio frequency module working in a 4G network LTE mode, and the high frequency module belongs to a radio frequency module working in a 5G network NR (New Radio) mode; or the above low frequency module and high frequency module both belong to the radio frequency module working in NR mode. The radio frequency transceiver module of the UE may include components such as a radio frequency signal processing device such as a filter and an antenna.

In the application scenario of the present disclosure, the base station schedules different carriers CA (Carrier Aggregation) with a large frequency span to transmit information to the user terminal. The base station may send the scheduling information of the carrier to the UE in the NR mode, wherein the scheduling information of the carrier may include: additional scheduling information and scheduling control information. The scheduling control information of the carrier is used to notify the target UE of what time-frequency resource block, what modulation coding scheme, and what MIMO operation mode to transmit downlink data information to the target UE. A complete scheduling in the present disclosure logically includes: the transmission of control information and transmission of data information are scheduled; and the end of one scheduling is defined by the completion of the transmission of the data information.

Based on this, the present disclosure provides a method for transmitting information, applied to a base station. Reference to FIG. 1, which is a flow chart showing a method for transmitting information according to an exemplary embodiment, the method may include the following steps:

In step 11, frequency information of a second carrier for bearing subsequent scheduling data information is determined.

In the embodiment of the present disclosure, the base station may determine the frequency information of the second carrier for bearing subsequent scheduling data information at any of the following occasions:

before performing a first scheduling by using a first carrier;

when performing the first scheduling by using the first carrier;

after completing the first scheduling by using the first carrier.

It is assumed that the subsequent scheduling is a scheduling that is sent immediately after the current scheduling, the base station needs to determine the carrier for bearing subsequent scheduling data information, that is, the frequency information of the second carrier.

In step 12, a current radio frequency support capability of a user equipment is determined.

According to whether the radio frequency support capability information of the target UE is preset the base station, the implementation of the foregoing step 12 may include two cases:

In a first case, the radio support capability of the target UE is preset in the base station;

The base station may determine the current radio frequency support capability of the target UE according to a frequency range of the first carrier.

It is assumed that the target UE is UE1, UE1 can support two operating frequency bands. A correspondence between a device identifier of the UE1 and the supported operating frequency band is preset in the base station, which is illustratively shown in Table 1:

TABLE 1

| device identifier | operating frequency band |
| --- | --- |
| UE1 | 4.910 GHz~4.920 GHz |
|  | 5.910 GHz~5.920 GHz |

It is assumed that the frequency range of the first carrier is 4.900 GHz to 4.920 GHz, by querying table 1, the base station can learn that: the current radio frequency support capability of the UE1 is 4.910 GHz to 4.920 GHz.

In a second case, the radio frequency support capability information of the target UE is not stored in the base station in advance; the base station may obtain the current radio support capability of the target UE by using at least one of the following methods:

In the obtaining method 1, the base station receives the current radio frequency support capability reported by the target UE;

In the present disclosure, the UE can support at least two operating frequency bands, and each operating frequency band corresponds to one type of radio frequency support capability information. Wherein, the radio frequency support capability information may be expressed as at least one of the following: a bandwidth, a frequency range of the operating frequency band, at least two sensitive frequency points outside the operating frequency band, and a radio frequency tuning speed. Wherein, the radio frequency tuning speed may be the radio frequency tuning speed of the target UE as a whole or the radio frequency tuning speed of the current radio frequency transceiver module.

Regarding the obtaining occasion, a user equipment may report the radio frequency support capability information of each operating frequency band to the base station covering the cell when accessing a cell network for the first time, or obtain the radio frequency support capability information of the current operating frequency band of the UE, when communicating with the base station through the first carrier, so that when the base station schedules different carriers to send information to the user equipment, it can determine whether it is necessary to issue scheduling information related to the subsequent scheduling to the user equipment according to the current radio frequency support capability of the UE.

In the obtaining method 2, the base station may first obtain the device type information of the target UE, for example, the unified category information; the base station queries a device capability list stored in a preset database according to the device type information of the target UE, and determine the radio frequency support capability of the target UE. Wherein, the device capability list records the correspondence between the device type and the radio frequency support capability. Further, the current radio frequency support capability of the target UE is determined according to the frequency range of the first carrier.

In step 13, if frequency of the second carrier exceeds the current radio frequency support capability of the user equipment, scheduling information of the second carrier is sent to the user equipment through a first carrier;

wherein, the scheduling information of the second carrier refers to the scheduling information related to the second carrier and transmitted through the first carrier. The scheduling information of the second carrier includes at least: additional scheduling information of the subsequent scheduling, and may further include: scheduling control information of the subsequent scheduling. Wherein, the additional scheduling information of the subsequent scheduling includes: the frequency information of the second carrier, and the scheduling time of the second carrier, and may further include: a location of scheduling control information of the subsequent scheduling. The location of the scheduling control information of the subsequent scheduling refers to the location information of the scheduling control information of the subsequent scheduling in the second carrier resource.

In the present disclosure, the base station may determine whether the frequency of the second carrier exceeds the current radio frequency support capability of the user equipment, according to the frequency information of the second carrier and the current operating frequency band of the UE. The embodiment of the present disclosure may determine the frequency of the second carrier exceeds the current radio frequency support capability of the user equipment by using the following four manners:

In a first determining manner, if the current radio frequency support capability of the user equipment obtained by the base station is the bandwidth of the current operating frequency band of the UE, for example, 10 MHz. The base station can determine the frequency span of the second carrier relative to the first carrier, for example, 1 GHz. After comparison, the frequency span is far beyond the bandwidth of the current operating frequency band of the UE, and it is determined that the frequency of the second carrier exceeds the current radio frequency support capability of the UE.

In a second determining manner, the current radio frequency support capability of the user equipment obtained by the base station is a frequency range of the current operating frequency band of the UE, for example, 4.910 GHz to 4.920 GHz; and it is assumed that the frequency range of the second carrier determined by the base station is: 5.900 GHz to 5.920 GHz; after comparison of the specific frequency range, it can be known that the frequency of the second carrier exceeds the current radio frequency support capability of the UE.

In a third determining manner, the current radio frequency support capability of the user equipment obtained by the base station is at least two sensitive frequency points except the current operating frequency band of the UE. Exemplarily, it is still assumed that the current operating frequency band of the UE is: 4.910 GHz to 4.920 GHz, the UE can report two sensitive frequency points to the base station, for example, 4.900 GHz and 4.930 GHz; if the frequency span range between the second carrier and the first carrier includes any of the sensitive frequency points, it is determined that the frequency of the second carrier exceeds the current radio frequency support capability of the UE. Exemplarily, it is still assumed that the current operating frequency band of the UE is: 5.900 GHz to 5.920 GHz, and the frequency span range between the second carrier and the first carrier is: 4.920 GHz to 5.900 GHz, and the frequency span range includes a sensitive frequency point of the UE, 4.930 GHz. Therefore, it can be determined that the frequency of the second carrier exceeds the current radio frequency support capability of the UE.

In a fourth determining manner, the current radio frequency support capability of the user equipment obtained by the base station is the radio frequency tuning speed of the UE, that is, the frequency tuning range per unit time of the UE.

If the ratio between the frequency span switching from the first carrier to the second carrier and the interval duration of the original switching is greater than the radio frequency tuning speed of the target UE, it may be determined that the frequency of the second carrier exceeds the current radio frequency support capability of the UE.

After the base station determines that the frequency of the second carrier exceeds the current radio frequency support capability of the UE, the base station is required to notify the UE the information about the working frequency range of the second carrier and the scheduling time of the second carrier through the first carrier, so that the user equipment switches to the operating frequency band which can receive the second carrier, and is ready to receive the data information of the subsequent scheduling.

In the embodiment of the present disclosure, the relationship between the subsequent scheduling and the second carrier is: the information of the subsequent scheduling which is at least the data information, is sent to the target UE through the second carrier.

In the embodiment of the present disclosure, the additional scheduling information of the subsequent scheduling is sent to the UE through the first carrier. The scheduling control information of the subsequent scheduling may be sent to the UE through the first carrier, or may be issued to the UE through the second carrier. The following is a detailed description with specific examples:

In the embodiment of the present disclosure, before performing the subsequent scheduling, the base station first sends the additional scheduling information of subsequent scheduling to the user equipment through the first frequency range. Wherein, the additional scheduling information of the subsequent scheduling includes: a frequency range of the second carrier and a scheduling time of the second carrier. Wherein, the scheduling time of the second carrier may be specifically an interval duration between the carrier through which the base station schedules the first frequency range (that is, the first carrier) and the carrier through which the base station schedules the second frequency range (that is, the second carrier), that is, the Gp in the subsequent schematic diagram; or the specific time at which the base station prepares to schedule the second carrier.

In the embodiment of the present disclosure, the base station may issue the scheduling information of the second carrier to the user equipment through the first carrier by using the following manners:

In a first manner, when the current scheduling is performed, the additional scheduling information of the subsequent scheduling is sent to the user equipment In the embodiment of the present disclosure, the additional scheduling information of the subsequent scheduling further includes: a location of the scheduling control information of the subsequent scheduling in the second carrier resource, that is, a location of the scheduling control information of the subsequent scheduling.

Figure 2:
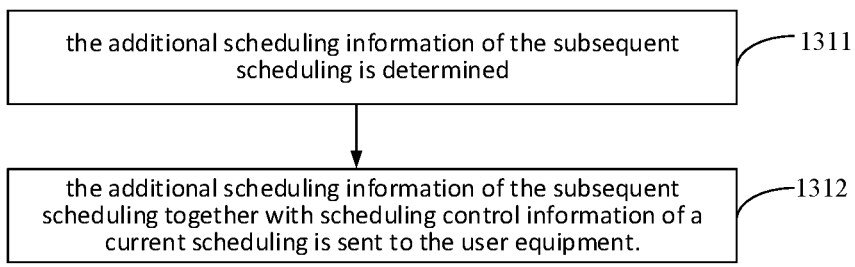
FIG. 2 is a flow chart showing another method for transmitting information according to an exemplary embodiment of the present disclosure.

Specifically, referring to FIG. 2, which is a flow chart showing a method for transmitting information according to an exemplary embodiment, the foregoing step 13 may include:

In step 1311, the additional scheduling information of the subsequent scheduling is determined;

In the present disclosure, the subsequent scheduling refers to a scheduling in which at least the data information is transmitted through the second carrier. In the embodiment of the disclosure, the additional scheduling information of the subsequent scheduling includes: a frequency range of the second carrier, a scheduling time of the second carrier, and a location of scheduling control information of the subsequent scheduling;

In the present disclosure, regarding determining the scheduling time of the second carrier, the following at least two determining manners may be included:

In a first determining manner, according to the statistical switching capability of the hardware of the UE, a time value is estimated empirically, which is set as the switching interval duration Gp between the first carrier and the second carrier, that is, the scheduling time of the second carrier, thereby ensuring that the target UE can successfully complete the switching of the operating frequency band before the base station switches to the second carrier.

In a second determining mode, the scheduling time of the second carrier is determined according to the radio frequency tuning speed of the target UE.

Corresponding to the fourth determining manner in which the frequency of the second carrier exceeds the current radio frequency support capability of the UE, in this case, the base station needs to re-determine the interval duration Gp switching from the first carrier to the second carrier.

The base station may determine the scheduling time of the second carrier according to the radio frequency tuning speed of the UE, including the following steps:

In step A, according to a current operating frequency band of the UE and the radio frequency tuning speed of the UE, a tuning duration required for the UE to be tuned from the current operating frequency band to a frequency band corresponding to the second carrier is determined.

In another embodiment of the present disclosure, when the radio frequency tuning speed is reported to the base station by the target UE, it may not be a specific natural value, but a code representation of the preset bit corresponding to the radio frequency tuning speed range where the radio frequency tuning speed is located, to reduce system signaling overhead and save transmission resources.

Illustratively, it is assumed that the current radio frequency tuning speed of the UE is: 820 MHz/s. The correspondence between the tuning speed range and the speed code is preset in the base station and the UE, and it is assumed that the speed code is represented by 2 bits, which is illustratively shown in Table 2:

TABLE 2

| radio frequency tuning speed range (Unit: MHz/s) | speed code |
|---|---|
| 100~300 | 00 |
| 300~600 | 01 |
| 600~900 | 10 |
| 900~1200 | 11 |

By querying Table 2, since the current radio frequency tuning speed of the UE is 820 MHz/s which is within the tuning speed range between 600 MHz/s and 900 MHz/s, the target UE can send the speed code 10 to the base station, so that the base station can determine the current radio frequency tuning speed of the target UE.

On the other hand, when calculating the tuning duration required by the target UE, the base station can calculate the tuning duration according to the lowest radio frequency tuning speed of the speed range, thereby ensuring that the interval duration Gp of the second scheduling determined in the subsequent step B is sufficiently long, so that the target UE has sufficient switching time.

In step B, the scheduling time of the second carrier is determined, according to an end time of the current scheduling and the tuning duration.

The foregoing process is specifically: the interval of the scheduling time of the second carrier (that is, the interval duration switching from the first carrier to the second carrier) is determined, according to the tuning duration of the UE. Wherein, the interval of the scheduling time of the second carrier is greater than or equal to the tuning duration to ensure that the target UE already has had the radio frequency support capability for receiving the second carrier, when the base station schedules the second carrier to send the data information of the subsequent scheduling to the target UE.

Regarding determining the location of the scheduling control information of the subsequent scheduling, in the present disclosure, in order to ensure that the UE can receive the scheduling control information of the subsequent scheduling, the scheduling control information of the subsequent scheduling may be set in the second carrier resource by using the following at least two manners:

In a first manner, the scheduling control information of the subsequent scheduling is set in the second carrier by using the lag processing manner.

Figure 3A:
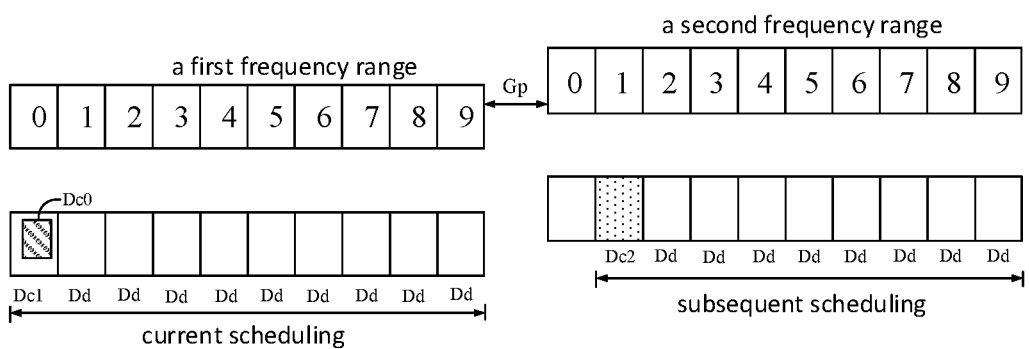
FIG. 3A is a schematic diagram showing a kind of transmission information according to an exemplary embodiment of the present disclosure.

Referring to FIG. 3A, which is a schematic diagram showing a transmission information according to an exemplary embodiment, in a normal case, the scheduling control information Dc2 of the subsequent scheduling is generally set at the header of the information transmission resource, for example, set in the header of the sub-frame of the subsequent scheduling (that is, in the symbol 0); in the embodiment of the present disclosure, the scheduling control information Dc2 of the subsequent scheduling may be set in the symbol 1 or the symbol 2 of the sub-frame of the subsequent scheduling by a lag manner. As shown in FIG. 3A, the base station may set the scheduling control information Dc2 of the subsequent scheduling to be in the second control information transmission unit (that is, in the symbol 1) by a lag manner, and the location of the scheduling control information of the subsequent scheduling is specifically the symbol 1.

In a second manner, the scheduling control information of the subsequent scheduling is set in the second carrier by using a redundancy processing manner.

Figure 3B:
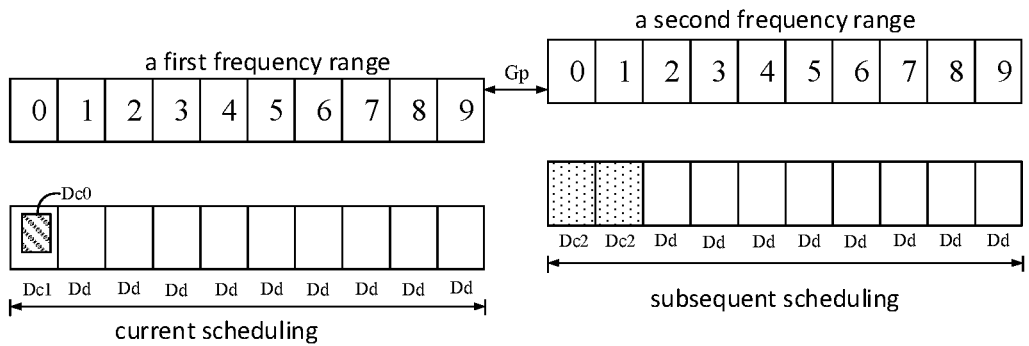
FIG. 3B is a schematic diagram showing another kind of transmission information according to an exemplary embodiment of the present disclosure.

In another embodiment of the present disclosure, it is also possible to redundantly transmit the scheduling control information of the subsequent scheduling using a plurality of basic information transmission units such as symbols. As shown in FIG. 3B, the scheduling control information Dc2 of the subsequent scheduling is loaded in the symbol 0 and symbol 1 redundantly, the location of the scheduling control information of the subsequent scheduling is specifically the symbol 0 and the symbol 1.

Compared with the conventional arrangement of Dc2 in the header of the second carrier resource, the two setting manner of Dc2 can avoid the user equipment from missing the reception of Dc2 due to the switching of the radio frequency transceiver module, thereby ensuring that the UE can receive the scheduling control information of the subsequent scheduling, further smoothly obtaining the data information of the subsequent scheduling, and avoiding the situation that the subsequent scheduling information cannot be received.

In step 1312, the additional scheduling information of the subsequent scheduling together with scheduling control information of a current scheduling is sent to the user equipment.

In the present disclosure, the current scheduling refers to a scheduling in which the scheduling control information and the data information is both transmitted through the first carrier. In the current scheduling, the UE can successfully receive the control information issued by the base station.

As shown in FIG. 3A and FIG. 3B, in the embodiment of the present disclosure, the base station may send the additional scheduling information Dc0 of the subsequent scheduling together with the scheduling control information Dc1 of the current scheduling to the user equipment when performing the current scheduling, so that the UE may obtain the frequency information and the scheduling time of the second carrier, and the location of the scheduling control information of the subsequent scheduling in advance, and prepare the obtaining of the information of the subsequent scheduling in advance to avoid missing the information of the subsequent scheduling.

In a second mode, after the current scheduling is completed, the additional scheduling information of the subsequent scheduling to the user equipment is sent to the user equipment through the first carrier.

Wherein, the completion of the current scheduling is defined by the completion of the transmission of data information, as shown in FIGS. 3A, 3B, 5A~5C, 7A, 7B, the basic data information transmission unit Dd bears the data information.

Figure 4:
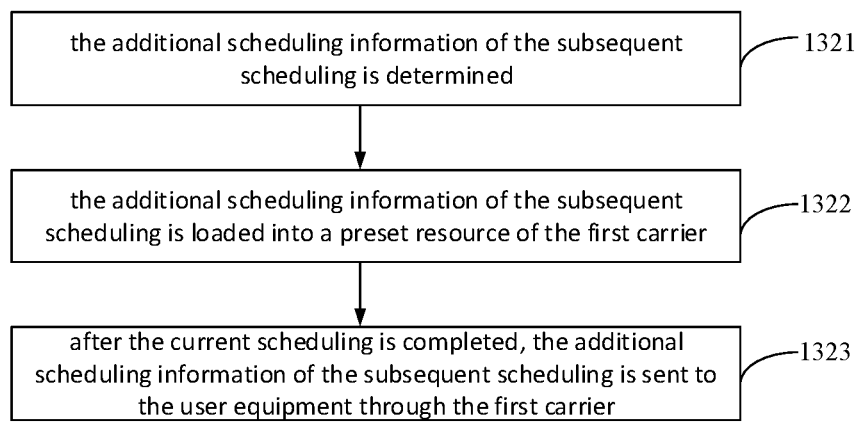
FIG. 4 is a flow chart showing another method for transmitting information according to an exemplary embodiment of the present disclosure.

Referring to FIG. 4, which is a flow chart showing another method for transmitting information according to an exemplary embodiment, the foregoing step 13 may include:

In step 1321, the additional scheduling information of the subsequent scheduling is determined, wherein, the additional scheduling information of the subsequent scheduling includes: a frequency range of the second carrier, a scheduling time of the second carrier, and a location of scheduling control information of the subsequent scheduling. This step is similar to the above step 1311, and details are not described herein again.

In step 1322, the additional scheduling information of the subsequent scheduling is loaded into a preset resource of the first carrier.

Figure 5A:
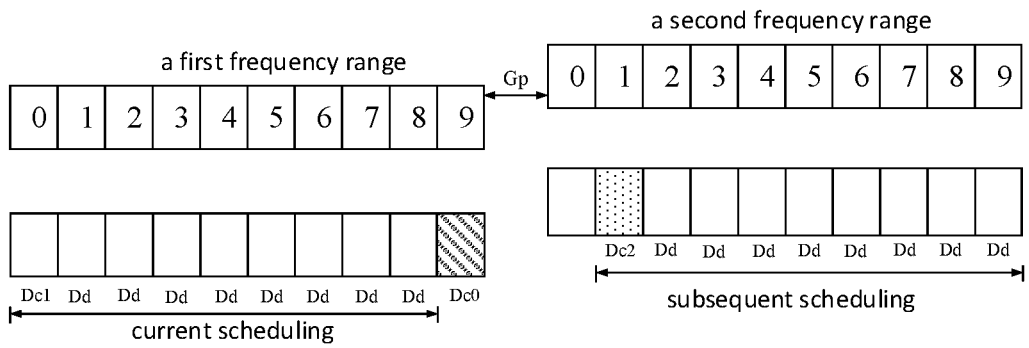
FIG. 5A is a schematic diagram showing another kind of transmission information according to an exemplary embodiment of the present disclosure.

In the embodiment of the present disclosure, the additional scheduling information of the subsequent scheduling may be loaded into a preset resource of the first carrier. According to the classifications of the foregoing preset resources, the following two cases may be included:

In a first case, referring to FIG. 5A, which is a schematic diagram showing another application scenario of transmitting information according to an exemplary embodiment, the base station may load the additional scheduling information Dc0 of the subsequent scheduling into the preset transmission resource for the downlink control information, for example, into the symbol 9 of the sub-frame of the first scheduling, and the additional scheduling information Dc0 is issued to the user equipment through the first frequency range (that is, the first carrier). In this embodiment, the scheduling control information Dc2 of the subsequent scheduling is set in the second carrier by using the lag processing manner.

Figure 5B:
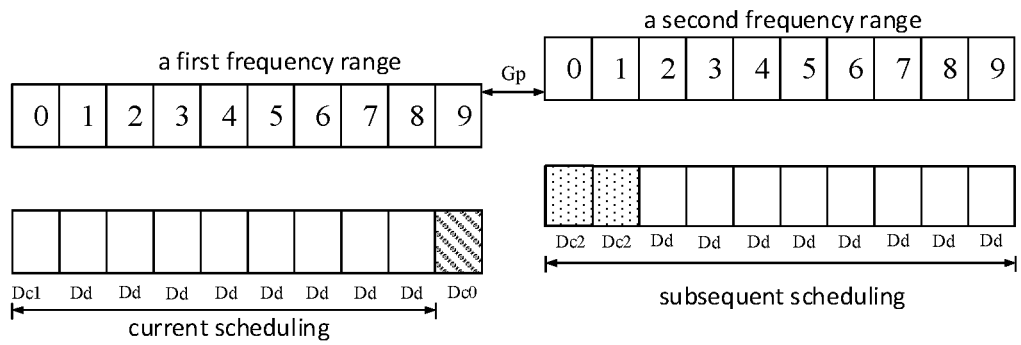
FIG. 5B is a schematic diagram showing another kind of transmission information according to an exemplary embodiment of the present disclosure.

In the application scenario shown in FIG. 5B, the setting manner of the scheduling control information Dc2 of the subsequent scheduling belongs to the case of redundancy setting.

Figure 5C:
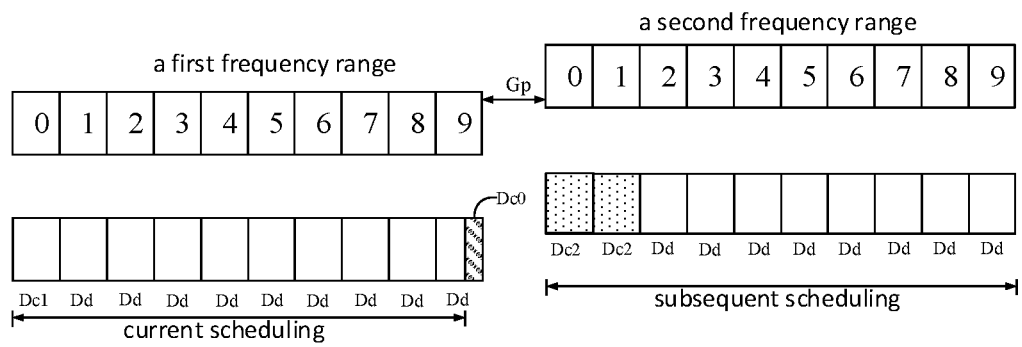
FIG. 5C is a schematic diagram showing another kind of transmission information according to an exemplary embodiment of the present disclosure.

In a second case, referring to FIG. 5C, which is a schematic diagram showing another application scenario of transmitting information according to an exemplary embodiment, the additional scheduling information Dc0 of the subsequent scheduling may be loaded into any one of the downlink data transmission unit of the current scheduling, that is, any Dd shown in FIG. 5C. Exemplarily, the additional scheduling information Dc0 of the subsequent scheduling may be loaded into the last downlink data transmission unit of the first carrier, that is, the symbol 9, and the data information of the current scheduling is bear in a part of the resources in the symbol 9, and the remaining resources are used for bearing the additional scheduling information Dc0 of the subsequent scheduling.

In the present disclosure, the base station may adopt a physical layer signaling, such as PDCCH (Physical Downlink Control Channel) signaling, and an upper layer signaling, such as RRC (Radio Resource Control) signaling, or the like, and the base station sends the additional scheduling information of the subsequent scheduling to the UE through the preset resource of the first carrier.

In step 1323, after the current scheduling is completed, the additional scheduling information of the subsequent scheduling is sent to the user equipment through the first carrier.

As shown in FIGS. 5A~5C, after completing the current scheduling, the base station may separately issue the additional scheduling information Dc0 of the subsequent scheduling to the user equipment through the first carrier.

In the embodiment of the present disclosure, the location of the scheduling control information Dc2 of the subsequent scheduling in the second carrier resource is not limited, and may be set in a lag manner as shown in FIG. 5A, or may be set in a redundancy manner as shown in the FIGS. 5B and 5C.

In a third mode, the additional scheduling information and the scheduling control information of the subsequent scheduling is sent through the first carrier.

Figure 6:
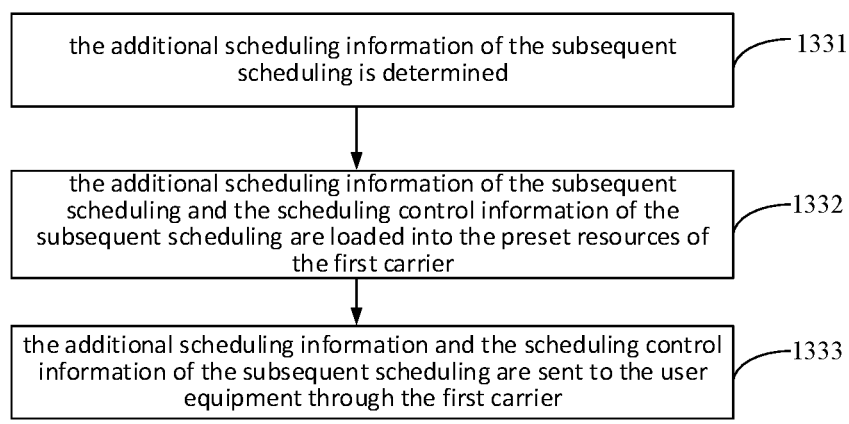
FIG. 6 is a flowchart showing another method for transmitting information according to an exemplary embodiment of the present disclosure.

Referring to FIG. 6, which is a flowchart showing another method for transmitting information according to an exemplary embodiment, the foregoing step 13 may include:

In step 1331, the additional scheduling information of the subsequent scheduling is determined.

In the embodiment of the present disclosure, the additional scheduling information of the subsequent scheduling includes: a frequency range of the second carrier, a scheduling time of the second carrier, and may further include: a location of scheduling control information of the subsequent scheduling in the first carrier resource.

In step 1332, the additional scheduling information of the subsequent scheduling and the scheduling control information of the subsequent scheduling are loaded into the preset resources of the first carrier;

In the embodiment of the present disclosure, according to the difference of the locations of the additional scheduling information and the scheduling control information of the subsequent scheduling in the first carrier resource, the following at least two cases may be included:

In a first case, the additional scheduling information and the scheduling control information of the subsequent scheduling are respectively loaded in different downlink control transmission resources of the first carrier. Wherein, the downlink control transmission resource is used for bearing downlink control information sent to the target UE. In the embodiment of the present disclosure, the downlink control information may include: the scheduling control information of the current scheduling, the additional scheduling information of the subsequent scheduling and the scheduling control information of the subsequent scheduling.

Referring to FIG. 7A, which is a schematic diagram showing another application scenario for transmitting information according to an exemplary embodiment, in the embodiment of the present disclosure, the additional scheduling information Dc0 of the subsequent scheduling together with the scheduling control information Dc1 of the current scheduling is loaded in the downlink control resource of the first carrier, as in the symbol 0; and the scheduling control information Dc2 of the subsequent scheduling is loaded in the downlink control resource of the first carrier, as in the symbol 9.

In another embodiment, in addition to information such as video resources bearing the data domain in the subsequent scheduling and encoding/decoding manner, the scheduling control information Dc2 of the subsequent scheduling may include the time interval Gp between the transmission of the control information of the subsequent scheduling and the data transmission of the subsequent scheduling, i.e., the time interval duration between the scheduling of the first carrier and the scheduling of the second carrier.

In a second case, the additional scheduling information and the scheduling control information of the subsequent scheduling are loaded into the same downlink control transmission resource in the first carrier.

Referring to FIG. 7B, which is a schematic diagram showing another application scenario for transmitting information according to an exemplary embodiment, in the embodiment of the present disclosure, the additional scheduling information Dc0 of the subsequent scheduling may be loaded into the downlink control transmission resource of the first carrier together with the scheduling control information Dc2 of the subsequent scheduling; the downlink control information transmission resource is located at the end of the first carrier resource, such as in the symbol 9.

In step 1333, the additional scheduling information and the scheduling control information of the subsequent scheduling are sent to the user equipment through the first carrier.

Corresponding to the first case, when the current scheduling is performed, the base station carries the transmission of the additional scheduling information Dc0 of the subsequent scheduling; and after the current scheduling is completed, the scheduling control information Dc2 of the subsequent scheduling may be sent to the user equipment through a separate downlink control transmission resource in the first carrier.

Corresponding to the second case, after the current scheduling is completed, the additional scheduling information Dc0 of the subsequent scheduling is sent to the user equipment through the first carrier together with the scheduling control information Dc2.

In step 14, the information is continued to transmit to the user equipment through the second carrier according to the scheduling information of the second carrier.

Corresponding to the first and second implementation manners of the foregoing step 13, after the base station completes the current scheduling and issues the additional scheduling information of the subsequent scheduling by using the first carrier (that is, the first frequency range), the base station sends the scheduling control information and the data information of the subsequent scheduling to the UE by using the second carrier (the second frequency range), according to the scheduling time of the second carrier, for example, the preset duration of interval Gp.

Corresponding to the foregoing third manner, after the base station completes the current scheduling and issues the additional scheduling information and the scheduling control information of the subsequent scheduling by using the first carrier (that is, the first frequency range), the base station sends the data information of the subsequent scheduling to the UE by using the second carrier (the second frequency range), according to the scheduling time of the second carrier, for example, the preset duration of interval Gp.

Correspondingly, the present disclosure also provides a method for transmitting information, which is applied to a user equipment. Referring to FIG. 8, which is a flow chart showing another method for transmitting information according to an exemplary embodiment, the method may include:

In step 21, the scheduling information of the second carrier is received through a first operating frequency band, wherein the scheduling information of the second carrier includes at least: additional scheduling information of subsequent scheduling;

Wherein, the additional scheduling information of the subsequent scheduling includes at least: a frequency range of the second carrier and a scheduling time of the second carrier. In the case that the scheduling control information of the subsequent scheduling is transmitted through the second carrier, the additional scheduling information of the subsequent scheduling may further include: a setting location of the scheduling control information of the subsequent scheduling in the second carrier resource.

Corresponding to the three implementation manners of the above step 13, the foregoing step 21 may include the following three implementation manners:

In the first implementation manner, when the scheduling control information of the current scheduling is obtained, the additional scheduling information of the subsequent scheduling is obtained, as shown in FIGS. 3A, 3B, and 7A;

In the second implementation manner, after the reception of the current scheduling information is completed, the additional scheduling information of the subsequent scheduling is separately obtained through the first operating frequency band;

As shown in FIGS. 5A and 5B, after the reception of the current scheduling information is completed, the UE may separately obtain the additional scheduling information of the subsequent scheduling by using the downlink control transmission resource of the first carrier, as shown in FIGS. 5A, 5B. Alternatively, when receiving the data information of the current scheduling, the UE obtains the additional scheduling information of the subsequent scheduling from any downlink data transmission unit, for example, from the last downlink data transmission unit of the current scheduling, as shown in FIG. 5C.

In the third implementation manner, after the reception of the data information of the current scheduling is completed, the additional scheduling information of the subsequent scheduling and the scheduling control information of the subsequent scheduling is received through the first operating frequency band, as shown in FIG. 7B.

In step 22, the first operating frequency band is switched to the second operating frequency band according to the additional scheduling information of the subsequent scheduling;

Taking the user equipment as the smart phone A as an example, the smart phone A is provided with at least two radio frequency transceiver modules. It is assumed that the first radio frequency transceiver module belongs to a low frequency module supporting the LTE system of the 4G network, and the corresponding first operating frequency band is 4900 MHz~4920 MHz; the second radio frequency transceiver module belongs to a high-frequency module supporting 5G system (that is, a NR system), and it is assumed that the operating frequency band is: 5900 MHz~5920 MHz.

It is assumed that the frequency range of the first carrier used by the base station to transmit the current scheduling information is: 4910 MHz to 4920 MHz, the smartphone A enables the first radio frequency transceiver module to receive the information issued by the first carrier. It is assumed that the base station prepares to use the second carrier having a frequency range of 5910 MHz to 5920 MHz at the next time to transmit the data of the subsequent scheduling to the smartphone A. When determining that the frequency span of the second carrier and the first carrier exceeds the radio frequency support capability of a radio frequency transceiver module of the smart phone A, the base station sends the additional scheduling information, such as the frequency information and the scheduling time of the second carrier, and the like to the smart phone A through the first carrier to enable smartphone A to switch the operating frequency band.

Illustratively, the frequency information of the second carrier included in the additional scheduling information Dc0 that is obtained by the smartphone A may be specifically: 5910 MHz to 5920 MHz, or the frequency span of the second carrier relative to the first carrier included in the additional scheduling information Dc0 that is obtained by the smartphone A may be 1 GHz. Since the frequency span exceeds the radio frequency support capability of the first radio frequency transceiver module, the smart phone A switches the current working radio frequency module from the first radio frequency transceiver module to the second radio frequency transceiver module, that is, from the first operating frequency band to the second operating frequency band.

In step 23, the subsequent scheduling information is received through the second operating frequency band.

In the embodiment of the present disclosure, the frequency range of the second operating frequency band of the UE and the frequency range of the second carrier are intersected.

Correspondingly, corresponding to the different implementation manners of the step 14 above, the implementation of the step 23 may include the following two cases:

In a first case, the control information and the data information of the subsequent scheduling are obtained through the second operating frequency band.

Figure 9:
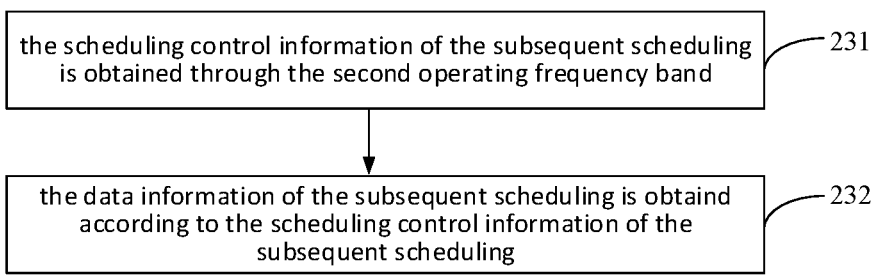
FIG. 9 is a flow chart showing a method for transmitting information according to an exemplary embodiment of the present disclosure.

Referring to FIG. 9, which is a flow chart showing a method for transmitting information according to an exemplary embodiment, the foregoing step 23 may include:

In step 231, the scheduling control information of the subsequent scheduling is obtained through the second operating frequency band;

In the embodiment of the present disclosure, the scheduling control information Dc2 of the subsequent scheduling may be obtained by using the following at least two manners:

In a first manner, the scheduling control information Dc2 of the subsequent scheduling is obtained at the header of the sub-frame of the subsequent scheduling.

In the embodiment of the present disclosure, in the case that the system has no special agreement, according to the preset protocol, the scheduling control information of the subsequent scheduling is set in the header of the second carrier resource. It is assumed that the second carrier resource performs the information transmission in units of sub-frame. Each sub-frame consists of 10 symbols with sequence numbers from 0 to 9. According to the preset protocol, the scheduling control information is set in the symbol of the header of the sub-frame, such as in the symbol 0. Then, when the second carrier is detected, the smartphone A obtains the scheduling control information Dc2 of the subsequent scheduling from the header of the carrier resource, that is, the symbol 0.

In the second manner, the scheduling control information of the subsequent scheduling is obtained from the second carrier resource according to the location information of the Dc2 included in the additional scheduling information Dc0 of the subsequent scheduling.

In the embodiment of the present disclosure, in order to ensure that the smart phone A can successfully obtain the scheduling control information Dc2 of the subsequent scheduling through the second carrier, the base station can also load Dc2 into the preset resource of the second carrier in a lag setting or redundancy setting manner. In this case, the base station may inform the user equipment of the location of the Dc2 in the second carrier through the additional scheduling information Dc0 of the subsequent scheduling. Correspondingly, the smart phone A can obtain the scheduling control information of the subsequent scheduling through the second carrier according to the location information of Dc2, as shown in FIGS. 3A, 3B, 5A, 5B, and 5C.

In step 232, the data information of the subsequent scheduling is obtained according to the scheduling control information of the subsequent scheduling.

The scheduling control information of the second carrier issued by the base station to the target UE is used to notify the target UE of what time-frequency resource block, what modulation coding scheme, and what MIMO operation mode to transmit downlink data information to the target UE. After the UE obtains the scheduling control information, the UE may obtain the data information from the downlink resources of the base station.

In the embodiment of the present disclosure, the scheduling control information Dc2 of the subsequent scheduling includes: the time frequency resource for bearing the data information of the subsequent scheduling, coding and decoding modes of the data information of the subsequent scheduling and the like. Therefore, the smart phone A can obtain the data information of the subsequent scheduling according to Dc2.

In the second case, the data information of the subsequent scheduling is obtained through the second operating frequency band.

In the embodiment shown in FIGS. 7A and 7B, since the smart phone A receives the scheduling control information Dc2 of the subsequent scheduling through the first operating frequency band in advance, the second operating frequency band is only used to obtain the data information of the subsequent scheduling.

Figure 10:
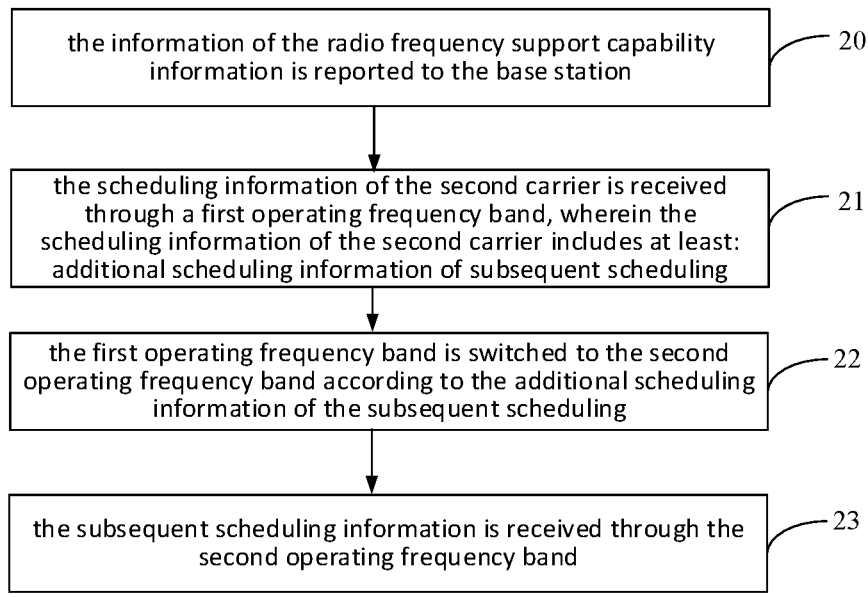
FIG. 10 is a flow chart showing another method for transmitting information according to an exemplary embodiment of the present disclosure.

Referring to FIG. 10, which is a flow chart showing another method for transmitting information according to an exemplary embodiment, on the basis of the embodiment shown in FIG. 8, before the step 21, the method may further include:

In step 20, the information of the radio frequency support capability information is reported to the base station, wherein the information of the radio frequency support capability includes: a bandwidth or frequency range of the current operating frequency band of the user equipment, at least two sensitive frequency points outside the current operating frequency band of the user equipment, or the radio frequency tuning speed of the user equipment.

Taking the user equipment as the smart phone A as an example, the smart phone A can actively report the radio frequency support capability information of each operating frequency band, in the case that the smart phone A first accesses to the base station of the cell in the first time. Taking the smart phone A provided with two radio frequency transceiver modules as an example, the operating frequency bands of the respective radio frequency transceiver modules are different. The radio frequency support capability information of each radio frequency transceiver module may be the bandwidth of the operating frequency band, such as 10 MHz; or the specific frequency range of the operating frequency band, for example, 4910 MHz to 4920 MHz; or at least two sensitive frequency points outside the operating frequency band, such as 4920 MHz, 4930 MHz.

In another embodiment of the present disclosure, the UE may also report the radio frequency support capability information of the current operating frequency band to the base station when communicating with the base station through the first carrier.

It can be seen that, when the base station transmits information to the UE through different carriers with a large frequency span, the method provided by the present disclosure may first notify the user equipment in advance by using the first carrier, when it is determined that the frequency span of the second carrier exceeds the current radio frequency support capability of the UE, so that the user equipment can adjust the operating frequency band in time after receiving the first scheduling information, thereby ensuring that the frequency band conversion is completed before the second carrier arrives, and ensuring successful reception of the subsequent scheduling data, reducing unnecessary retransmission, saving system resources, improving information transmission efficiency and reliability of information transmission.

For the foregoing embodiments of the method, for the sake of brevity, they are all described as a series of action combinations, but those skilled in the art should understand that the present disclosure is not limited by the order of actions described, as some steps may occur in other orders or concurrently with other steps in accordance with the present disclosure.

Secondly, those skilled in the art should also understand that the embodiments described in the specification are all optional embodiments, and the actions and modules involved are not necessarily required by the present disclosure.

Corresponding to the embodiment of the application function implementation method, the present disclosure also provides the embodiments of the application function implementation device and a corresponding terminal.

Figure 11:
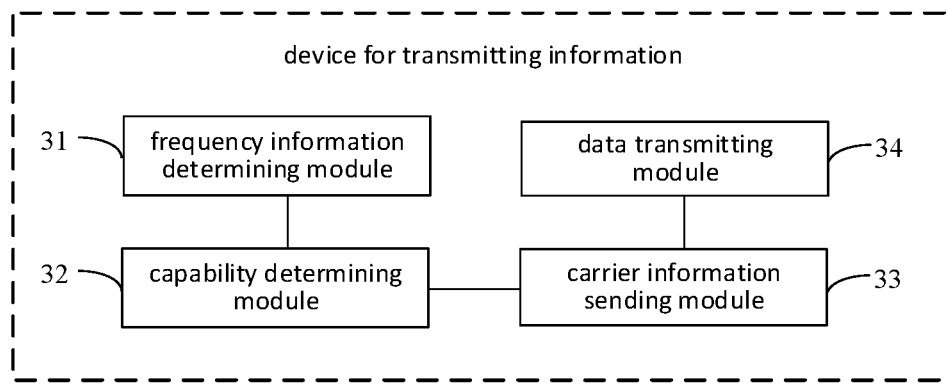
FIG. 11 is a block diagram showing a device for transmitting information according to an exemplary embodiment of the present disclosure.

Reference to FIG. 11, which is a block diagram showing a device for transmitting information according to an exemplary embodiment of the present disclosure, provided in a base station which establishes a connection with a user equipment via a first carrier, and the device may include:

a frequency information determining module 31, configured to determine frequency information of a second carrier for bearing subsequent scheduling data information;

a capability determining module 32, configured to determine a current radio frequency support capability of a user equipment;

a carrier information sending module 33, configured to send scheduling information of the second carrier to the user equipment through a first carrier, in a case where frequency of the second carrier exceeds the current radio frequency support capability of the user equipment; and a data transmitting module 34, configured to continue to transmit information to the user equipment through the second carrier according to the scheduling information of the second carrier.

Figure 12:
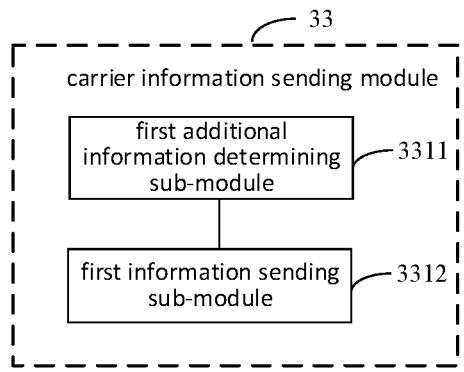
FIG. 12 is a block diagram showing another device for transmitting information according to an exemplary embodiment of the present disclosure.

Referring to FIG. 12, which is a block diagram showing another device for transmitting information according to an exemplary embodiment, on the basis of the embodiment of the device shown in FIG. 11, the carrier information sending module 33 may include a first additional information determining sub-module 3311, configured to determine additional scheduling information of the subsequent scheduling, wherein, the additional scheduling information of the subsequent scheduling includes: a frequency range of the second carrier, a scheduling time of the second carrier, and a location of scheduling control information of the subsequent scheduling;

a first information sending sub-module 3312, configured to send the additional scheduling information of the subsequent scheduling together with scheduling control information of a current scheduling to the user equipment;

wherein, the current scheduling refers to a scheduling in which data information transmission is bear by the first carrier; and the subsequent scheduling refers to a scheduling in which the data information transmission is bear by the second carrier.

Figure 13:
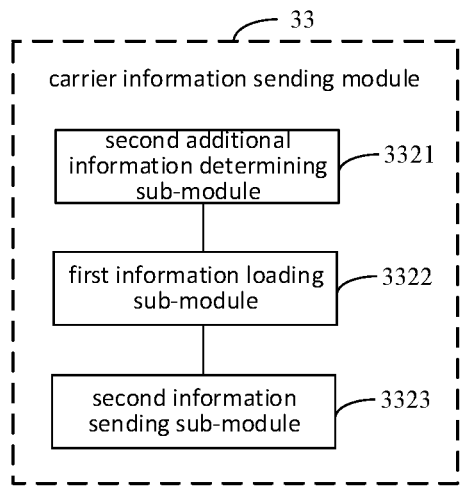
FIG. 13 is a block diagram showing another device for transmitting information according to an exemplary embodiment of the present disclosure.

Referring to FIG. 13, which is a block diagram showing another device for transmitting information according to an exemplary embodiment, on the basis of the embodiment of the device shown in FIG. 11, the carrier information sending module 33 may include:

a second additional information determining sub-module 3321, configured to determine additional scheduling information of the subsequent scheduling, wherein, the additional scheduling information of the subsequent scheduling includes: a frequency range of the second carrier, a scheduling time of the second carrier, and a location of scheduling control information of the subsequent scheduling;

a first information loading sub-module 3322, configured to load the additional scheduling information of the subsequent scheduling into a preset resource of the first carrier;

a second information sending sub-module 3323, configured to send the additional scheduling information of the subsequent scheduling to the user equipment through the first carrier, after the current scheduling is completed.

Figure 14:
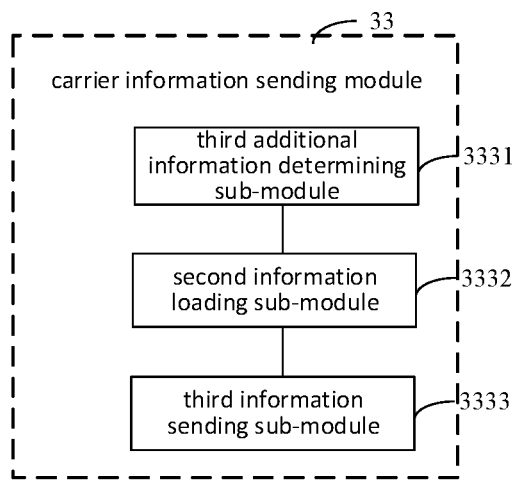
FIG. 14 is a block diagram showing another device for transmitting information according to an exemplary embodiment of the present disclosure.

Referring to FIG. 14, which is a block diagram showing another device for transmitting information according to an exemplary embodiment, on the basis of the embodiment of the device shown in FIG. 11, the carrier information sending module 33 may include:

a third additional information determining sub-module 3331, configured to determine additional scheduling information of the subsequent scheduling, wherein, the additional scheduling information of the subsequent scheduling includes: a frequency range of the second carrier and a scheduling time of the second carrier;

a second information loading sub-module 3332, configured to load the additional scheduling information of the subsequent scheduling and the scheduling control information into the preset resource of the first carrier; and a third information sending sub-module 3333, configured to send the additional scheduling information of the subsequent scheduling and the scheduling control information to the user equipment through the first carrier.

In the embodiment of the present disclosure, if the scheduling time of the second carrier is an interval duration between the current scheduling and the subsequent scheduling; the current radio frequency support capability of the user equipment is a radio frequency tuning speed of the user equipment, any of the above additional information determining sub-modules may determine the scheduling time of the second carrier in the additional scheduling information of the subsequent scheduling according to the radio frequency tuning speed of the user equipment.

Figure 15:
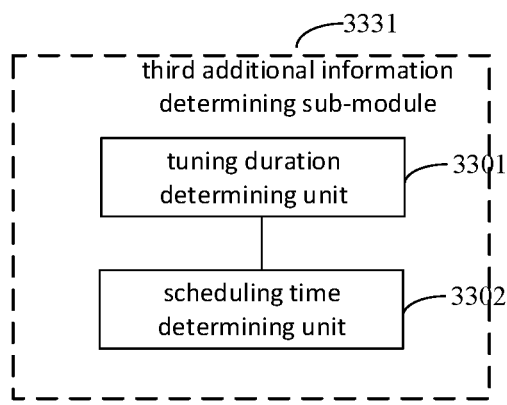
FIG. 15 is a block diagram showing another device for transmitting information according to an exemplary embodiment of the present disclosure.

The third additional information determining sub-module 3331 taken as an example, referring to FIG. 15, which is a block diagram showing another device for transmitting information according to an exemplary embodiment, on the basis of the embodiment of the device shown in FIG. 14, the third additional information determining sub-module 3331 may include:

a tuning duration determining unit 3301, configured to determine a tuning duration required for the user equipment to be tuned from the current operating frequency band to a frequency band corresponding to the second carrier, according to a current operating frequency band of the user equipment and the radio frequency tuning speed of the user equipment;

a scheduling time determining unit 3302, configured to determine the scheduling time of the second carrier, according to an end time of the current scheduling and the tuning duration.

It should be noted that the foregoing first additional information determining sub-module 3311 and the second additional information determining sub-module 3321 may include: the tuning duration determining unit 3301 and the scheduling time determining unit 3302.

Figure 16:
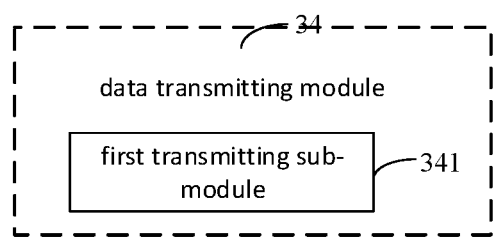
FIG. 16 is a block diagram showing another device for transmitting information according to an exemplary embodiment of the present disclosure.

Referring to FIG. 16, which is a block diagram showing another device for transmitting information according to an exemplary embodiment, if the structure of the carrier information sending module 33 is as shown in FIG. 12 or FIG. 13, the above data transmitting module 34 in FIG. 11 may include the following:

a first transmitting sub-module 341, configured to send the scheduling control information and data information of the subsequent scheduling to the user equipment through the second carrier according to the scheduling time of the second carrier, after the additional scheduling information of the subsequent scheduling and the current scheduling is completed by using the first carrier.

Figure 17:
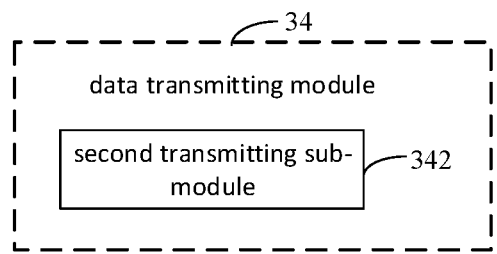
FIG. 17 is a block diagram showing another device for transmitting information according to an exemplary embodiment of the present disclosure.

Referring to FIG. 17, which is a block diagram showing another device for transmitting information according to an exemplary embodiment, if the structure of the carrier information sending module 33 is as shown in FIG. 14, the above data transmitting module 34 in FIG. 11 may include:

a second transmitting sub-module 342, configured to send the data information of the subsequent scheduling to the user equipment through the second carrier according to the scheduling time of the second carrier, after the current scheduling, the additional scheduling information for transmitting the subsequent scheduling and the scheduling control information of the subsequent scheduling is completed by using the first carrier.

Figure 18:
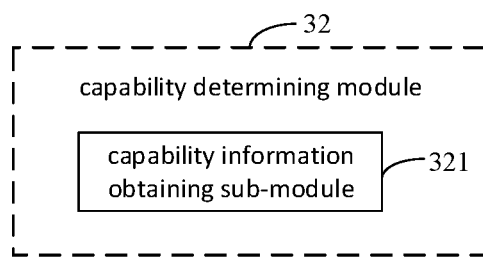
FIG. 18 is a block diagram showing another device for transmitting information according to an exemplary embodiment of the present disclosure.

Referring to FIG. 18, which is a block diagram showing another device for transmitting information according to an exemplary embodiment, on the basis of the embodiment of the device shown in FIG. 11, the capability determining module 32 may include:

a capability information obtaining sub-module 321, configured to obtain information of the current radio frequency support capability of the user equipment, wherein, the information of the current radio frequency support capability includes at least one of the following:

a bandwidth or frequency range of the current operating frequency band of the user equipment;

at least two sensitive frequency points outside the current operating frequency band of the user equipment;

the radio frequency tuning speed of the user equipment.

Correspondingly, the present disclosure also provides a device for transmitting information, provided in the user equipment.

Figure 19:
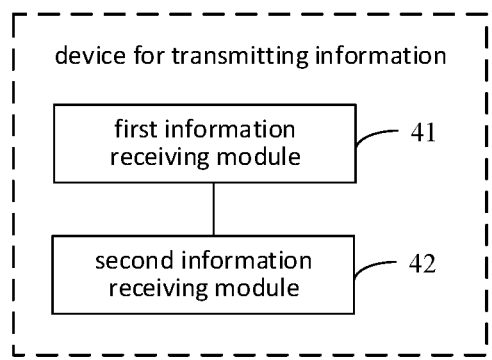
FIG. 19 is a block diagram showing a device for transmitting information according to an exemplary embodiment of the present disclosure.

Referring to FIG. 19, which is a block diagram showing a device for transmitting information according to an exemplary embodiment, the device may include:

a first information receiving module 41, configured to receive scheduling information of a second carrier through a first operating frequency band, wherein the scheduling information of the second carrier includes at least: additional scheduling information of subsequent scheduling;

a frequency band switching module, configured to switch the first operating frequency band to a second operating frequency band according to the additional scheduling information of the subsequent scheduling; and a second information receiving module 42, configured to receive the subsequent scheduling through the second operating frequency band.

Figure 20:
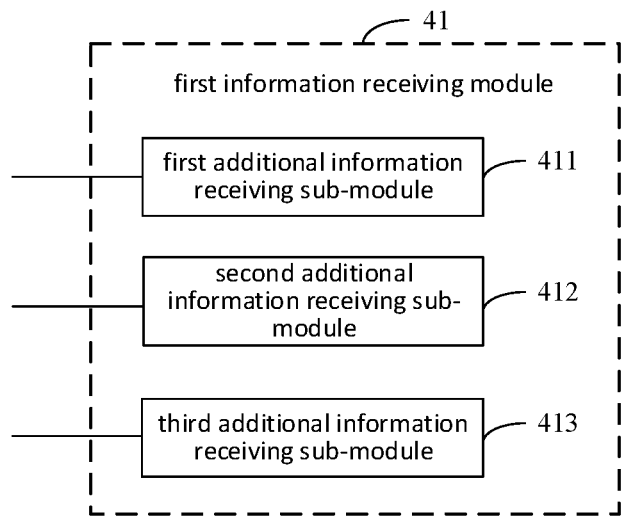
FIG. 20 is a block diagram showing another device for transmitting information according to an exemplary embodiment of the present disclosure.

Referring to FIG. 20, which is a block diagram showing another device for transmitting information according to an exemplary embodiment, on the basis of the embodiment of the device shown in FIG. 19, the first information receiving module 41 may include any of the following additional information receiving sub-module:

a first additional information receiving sub-module 411, configured to obtain the additional scheduling information of the subsequent scheduling when scheduling control information of the current scheduling is obtained;

a second additional information receiving sub-module 412, configured to obtain the additional scheduling information of the subsequent scheduling through the first operating frequency band, after reception of the data information of the current scheduling is completed; and a third additional information receiving sub-module 413, configured to receive the scheduling control information of the subsequent scheduling and the additional scheduling information of the subsequent scheduling through the first operating frequency band, after reception of the data information of the current scheduling is completed.

Figure 21:
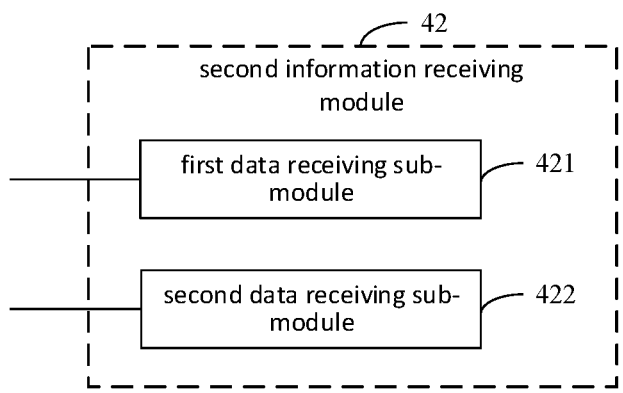
FIG. 21 is a block diagram showing another device for transmitting information according to an exemplary embodiment of the present disclosure.

Referring to FIG. 21, which is a block diagram showing another device for transmitting information according to an exemplary embodiment, on the basis of the embodiment of the device shown in FIG. 19, the second information receiving module 42 may include:

a first data receiving sub-module 421, configured to obtain the scheduling control information and data information of the subsequent scheduling through the second operating frequency band; and a second data receiving sub-module 422, configured to obtain the data information of the subsequent scheduling through the second operating frequency band.

Figure 22:
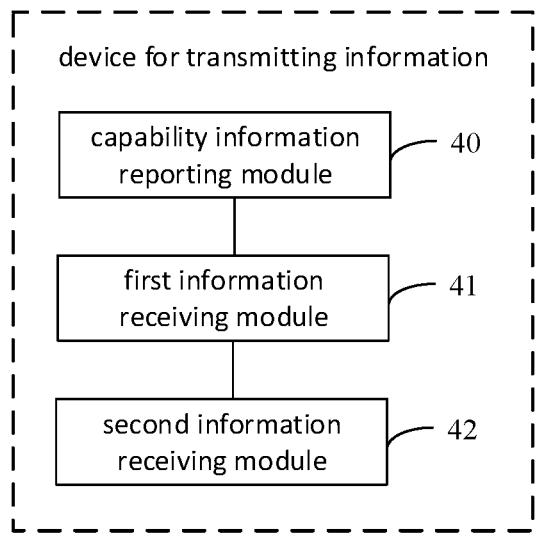
FIG. 22 is a block diagram showing another device for transmitting information according to an exemplary embodiment of the present disclosure.

Referring to FIG. 22, which is a block diagram showing another device for transmitting information according to an exemplary embodiment, on the basis of the embodiment of the device shown in FIG. 19, the device may further include:

a capability information reporting module 40, configured to report the information of the radio frequency support capability to a base station, wherein, the information of the current radio frequency support capability includes at least one of the following:

a bandwidth or frequency range of one operating frequency band;

at least two sensitive frequency points outside the operating frequency band;

the radio frequency tuning speed of the user equipment.

For the device embodiment, since it basically corresponds to the method embodiment, it can be referred to the description of the method embodiment. The device embodiments described above are merely illustrative, wherein the units described as separate components may or may not be physically separated, and the components displayed as units may or may not be physical units, that is, may be located in one place, or they can be distributed to the multiple network elements. Some or all of the modules may be selected according to actual needs to achieve the objectives of the present disclosure. Those skilled in the art can understand and implement the method without any inventive work.

Correspondingly, in an aspect, a device for transmitting information is provided, including: a processor; and a memory for storing instructions executable for the processor;

wherein the processor is configured to:

determine frequency information of a second carrier for bearing subsequent scheduling data information;

determine a current radio frequency support capability of a user equipment;

if frequency of the second carrier exceeds the current radio frequency support capability of the user equipment, send scheduling information of the second carrier to the user equipment through a first carrier; and continue to transmit information to the user equipment through the second carrier according to the scheduling information of the second carrier.

Correspondingly, in another aspect, a device for transmitting information is provided, including: a processor; and a memory for storing instructions executable for the processor;

wherein the processor is configured to:

receive scheduling information of a second carrier through a first operating frequency band, wherein the scheduling information of the second carrier includes at least: additional scheduling information of subsequent scheduling;

switch the first operating frequency band to a second operating frequency band according to the additional scheduling information of the subsequent scheduling; and receive the subsequent scheduling through the second operating frequency band.

Figure 23:
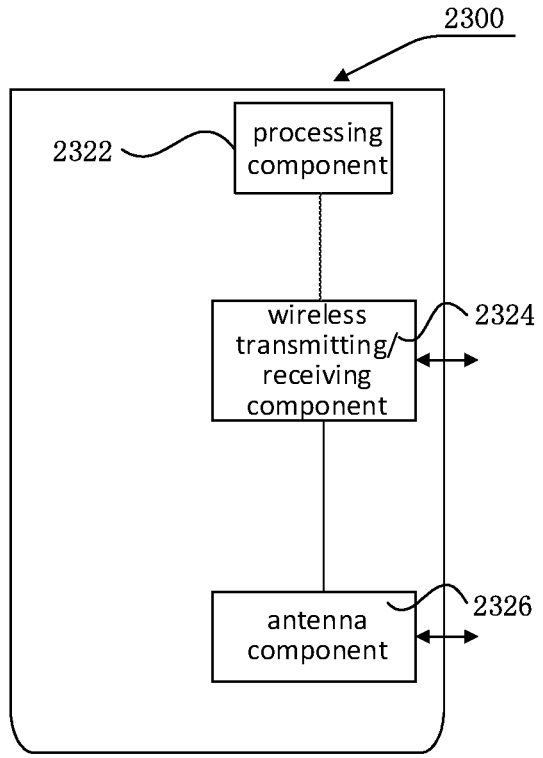
FIG. 23 is a schematic structural diagram showing a device for transmitting information according to an exemplary embodiment of the present disclosure.

As shown in FIG. 23, which is a schematic structural diagram showing a device 2300 for transmitting information according to an exemplary embodiment, the device 2300 can be provided as a base station. Referring to FIG. 23, the device 2300 includes a processing component 2322, a wireless transmitting/receiving component 2324, an antenna component 2326, and a signal processing portions specific to the wireless interface. The processing component 2322 may further include one or more processors.

One of the processing components 2322 can be configured to:

determine frequency information of a second carrier for bearing subsequent scheduling data information;

determine a current radio frequency support capability of a user equipment;

if frequency of the second carrier exceeds the current radio frequency support capability of the user equipment, send scheduling information of the second carrier to the user equipment through a first carrier; and continue to transmit information to the user equipment through the second carrier according to the scheduling information of the second carrier.

In an exemplary embodiment, there is also provided a non-transitory computer-readable storage medium storing computer instructions thereon. The computer instructions are executed by the processing components 2322 of the device 2300 to perform any of the above method for transmitting information. For example, the non-transitory computer readable storage medium may be a ROM, a random-access memory (RAM), a CD-ROM, a magnetic tape, a floppy disc, and an optical data storage device.

Figure 24:
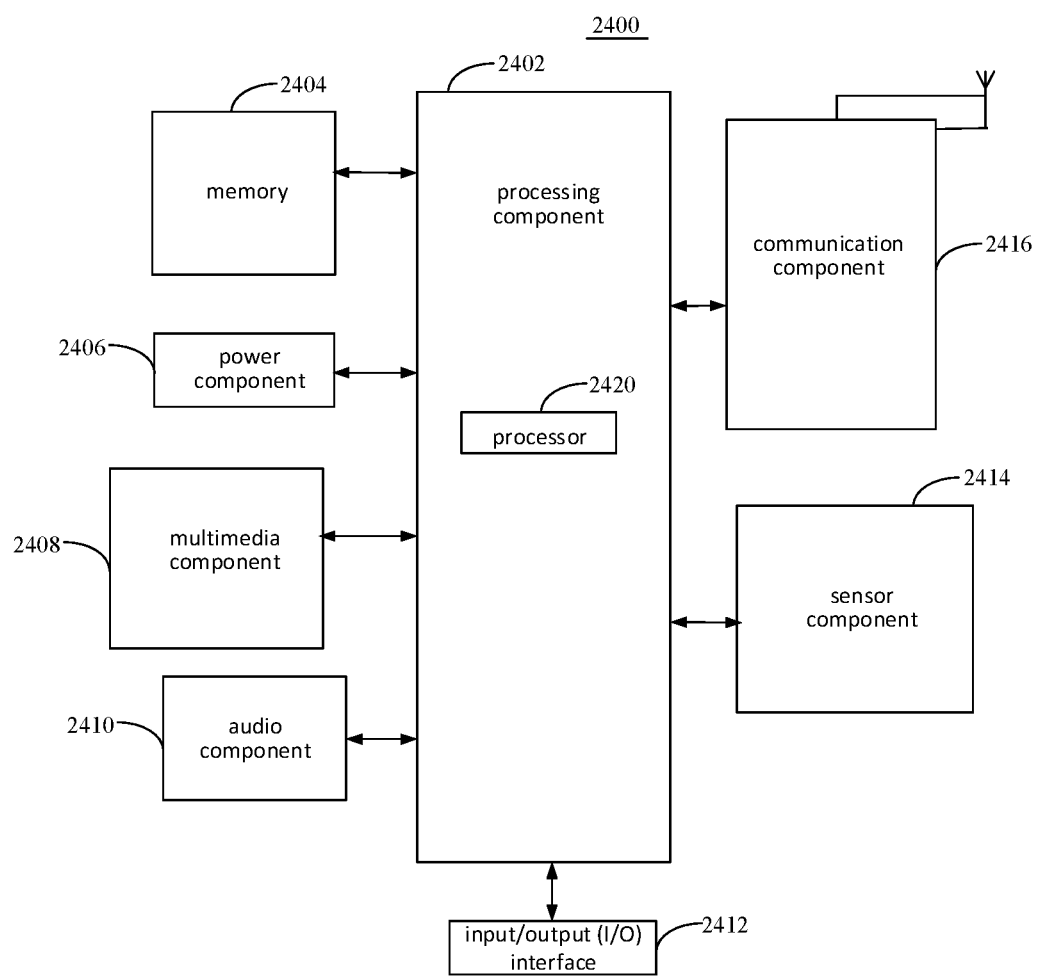
FIG. 24 is a schematic structural diagram showing another device for transmitting information according to an exemplary embodiment of the present disclosure.

FIG. 24 is a schematic structural diagram showing a device 2400 for transmitting information according to an exemplary embodiment. For example, the device 2400 may be a user equipment in a 5G network, and may specifically be a mobile phone, a computer, a digital broadcast terminal, a messaging device, a game console, a tablet device, a medical device, a fitness device, a personal digital assistant, a wearable device, such as a smart watch, smart glasses, a smart bracelet, smart running shoes, etc., can belong to eMBB (Enhanced Mobile Broad Band), mMTC (Massive Machine Type Communication), URLLC (Ultra Reliable Low Latency Communication) and other types of equipment in 5G network.

Referring to FIG. 24, the device 2400 may include one or more of the following components: a processing component 2402, a memory 2404, a power component 2406, a multimedia component 2408, an audio component 2410, an input/output (I/O) interface 2412, a sensor component 2414, and a communication component 2416.

The processing component 2402 typically controls the overall operations of the device 2400, such as the operations associated with display, telephone calls, data communications, camera operations, and recording operations. The processing component 2402 can include one or more processors 2420 to execute instructions to perform all or part of the steps in the above described methods. Moreover, the processing component 2402 can include one or more modules to facilitate the interaction between the processing component 2402 and other components. For example, the processing component 2402 can include a multimedia module to facilitate the interaction between the multimedia component 2408 and the processing component 2402.

The memory 2404 is configured to store various types of data to support the operation of the device 2400. Examples of such data include instructions for any application or method operated on device 2400, such as the contact data, the phone book data, messages, pictures, videos, and the like. The memory 2404 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2406 provides power to various components of the device 2400. The power component 2406 can include a power management system, one or more power sources, and other components associated with the generation, management, and distribution of power in the device 2400.

The multimedia component 2408 includes a screen providing an output interface between the device 2400 and the user t. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2408 includes a front camera and/or a rear camera. When the device 2400 is in an operation mode, such as a photographing mode or a video mode, the front camera and/or the rear camera can receive external multimedia datum. Each of the front camera and the rear camera may be a fixed optical lens system or have focus and optical zoom capability.

The audio component 2410 is configured to output and/or input an audio signal. For example, the audio component 2410 includes a microphone (MIC) configured to receive an external audio signal when the device 2400 is in an operation mode, such as a call mode, a recording mode, and a voice recognition mode. The received audio signal may be further stored in the memory 2404 or sent via the communication component 2416. In some embodiments, the audio component 2410 also includes a speaker for outputting the audio signal.

The I/O interface 2412 provides an interface between the processing component 2402 and peripheral interface modules, such as a keyboard, a click wheel, buttons, and the like. These buttons may include, but are not limited to, a home button, a volume button, a starting button, and a locking button.

The sensor component 2414 includes one or more sensors for providing status assessments of various aspects of the device 2400. For example, the sensor component 2414 can detect an open/closed status of the device 2400, relative locating of components, such as the display and the keypad of the device 2400. The sensor component 2414 can also detect a change in location of one component of the device 2400 or the device 2400, the presence or absence of user contact with the device 2400, an orientation, or an acceleration/deceleration of the device 2400, and a change in temperature of the device 2400. The sensor component 2414 can include a proximity sensor configured to detect the presence of nearby objects without any physical contact. The sensor component 2414 can also include a light sensor, such as a CMOS or CCD image sensor, configured to use in imaging applications. In some embodiments, the sensor component 2414 can also include an accelerometer sensor, a gyroscope sensor, a magnetic sensor, a pressure sensor, or a temperature sensor.

The communication component 2416 is configured to facilitate wired or wireless communication between the device 2400 and other devices. The device 2400 can access a wireless network based on a communication standard, such as WiFi, 2G or 3G, or a combination thereof. In an exemplary embodiment, the communication component 2416 receives broadcast signals or broadcast associated information from an external broadcast management system via a broadcast channel. In an exemplary embodiment, the communication component 2416 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In an exemplary embodiment, the device 2400 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components.

In an exemplary embodiment, there is also provided a non-transitory computer-readable storage medium storing computer instructions thereon, such as a memory 2404 including instructions executable by the processor 2420 of the device 2400 to perform the above method for transmitting information. For example, the non-transitory computer readable storage medium may be a ROM, a random-access memory (RAM), a CD-ROM, a magnetic tape, a floppy disc, and an optical data storage device.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

The invention claimed is:

1. A method for transmitting information, applied to a base station, wherein the base station establishes a connection with a user equipment via a first carrier that bears current scheduling information for a current scheduling, the method comprising:
   determining frequency information of a second carrier for bearing subsequent scheduling information for a subsequent scheduling after the current scheduling;
   determining a current radio frequency support capability of the user equipment;
   in a case that frequency of the second carrier is higher than the current radio frequency support capability of the user equipment, sending scheduling information of scheduling of the second carrier to the user equipment through the first carrier; and
   transmitting information to the user equipment through the second carrier according to the scheduling information of the second carrier,
   wherein the determining the current radio frequency support capability of a user equipment comprises:
   obtaining information of the current radio frequency support capability of the user equipment, wherein, the information of the current radio frequency support capability comprises:
   a bandwidth or frequency range of the current operating frequency band of the user equipment;
   at least two sensitive frequency points outside the current operating frequency band of the user equipment; and
   a radio frequency tuning speed of the user equipment.

2. The method according to claim 1, wherein the sending scheduling information of scheduling of the second carrier to the user equipment through the first carrier comprises:
   determining additional scheduling information of the subsequent scheduling, wherein, the additional scheduling information of the subsequent scheduling comprises: a frequency range of the second carrier, a scheduling time of the second carrier, and a location of scheduling control information of the subsequent scheduling; and
   sending the additional scheduling information of the subsequent scheduling together with scheduling control information of the current scheduling to the user equipment.

3. The method according to claim 1, wherein the sending scheduling information of scheduling of the second carrier to the user equipment through the first carrier comprises:
   determining additional scheduling information of the subsequent scheduling, wherein, the additional scheduling information of the subsequent scheduling comprises: a frequency range of the second carrier, a scheduling time of the second carrier, and a location of scheduling control information of the subsequent scheduling;
   loading the additional scheduling information of the subsequent scheduling into a pre-configured resource of the first carrier; and
   sending the additional scheduling information of the subsequent scheduling to the user equipment through the first carrier, after the current scheduling is completed.

4. The method according to claim 1, wherein the sending scheduling information of scheduling of the second carrier to the user equipment through the first carrier comprises:
   determining additional scheduling information of the subsequent scheduling, wherein, the additional scheduling information of the subsequent scheduling comprises: a frequency range of the second carrier and a scheduling time of the second carrier;
   loading the additional scheduling information of the subsequent scheduling and the scheduling control information into the pre-configured resource of the first carrier; and
   sending the additional scheduling information of the subsequent scheduling and the scheduling control information to the user equipment through the first carrier.

5. The method according to claim 2, wherein the scheduling time of the second carrier is an interval duration between the current scheduling and the subsequent scheduling; the current radio frequency support capability of the user equipment is a radio frequency tuning speed of the user equipment;
   determining the scheduling time of the second carrier comprises:
   according to a current operating frequency band of the user equipment and the radio frequency tuning speed of the user equipment, determining a tuning duration required for the user equipment to be tuned from the current operating frequency band to a frequency band corresponding to the second carrier;
   determining the scheduling time of the second carrier, according to an end time of the current scheduling and the tuning duration.

6. The method according to claim 2, wherein said transmitting information to the user equipment through the second carrier according to the scheduling information of the second carrier comprises:
   sending the scheduling control information and data information of the subsequent scheduling to the user equipment through the second carrier according to the scheduling time of the second carrier, after the additional scheduling information of the subsequent scheduling and the current scheduling is completed by using the first carrier.

7. The method according to claim 4, wherein the transmitting information to the user equipment through the second carrier according to the scheduling information of the second carrier comprises:
   sending the data information of the subsequent scheduling to the user equipment through the second carrier according to the scheduling time of the second carrier, after the current scheduling, the additional scheduling information for transmitting the subsequent scheduling and the scheduling control information of the subsequent scheduling is completed by using the first carrier.

8. A method for transmitting information, applied to a user equipment, the method comprising:
   receiving scheduling information of scheduling of a second carrier through a first carrier, wherein the scheduling information of the second carrier comprises at least: additional scheduling information of subsequent scheduling after the scheduling;

switching the first operating frequency band to a second operating frequency band according to the additional scheduling information of the subsequent scheduling; and receiving the subsequent scheduling through the second carrier, wherein prior to the receiving the scheduling information of the subsequent scheduling through the first operating frequency band, the method further comprises:

reporting the information of the radio frequency support capability to a base station, wherein, the information of the current radio frequency support capability comprises:

a bandwidth or frequency range of one operating frequency band;

at least two sensitive frequency points outside the operating frequency band; and the radio frequency tuning speed of the user equipment.

9. The method according to claim 8, wherein the additional scheduling information of the subsequent scheduling is received through the first operating frequency band by at least one of:

obtaining the additional scheduling information of the subsequent scheduling when scheduling control information of the current scheduling is obtained;

obtaining the additional scheduling information of the subsequent scheduling through the first operating frequency band, after reception of the data information of the current scheduling is completed; or receiving the scheduling control information of the subsequent scheduling and the additional scheduling information of the subsequent scheduling through the first operating frequency band, after reception of the data information of the current scheduling is completed.

10. The method according to claim 8, wherein the receiving the subsequent scheduling through the second operating frequency band comprises:

obtaining the scheduling control information and data information of the subsequent scheduling through the second operating frequency band; or obtaining the data information of the subsequent scheduling through the second operating frequency band.

11. A device for transmitting information, comprising:

a processor; and a non-transitory memory for storing instructions executable for the processor;

wherein the processor is configured to execute the instructions to realize operations for transmitting information, applied to a base station, wherein the base station establishes a connection with a user equipment via a first carrier that bears current scheduling information for a current scheduling, the operations including:

determining frequency information of a second carrier for bearing subsequent scheduling information for a subsequent scheduling after the current scheduling;

determining a current radio frequency support capability of a user equipment;

in a case that frequency of the second carrier is higher than the current radio frequency support capability of the user equipment, send scheduling information of scheduling of the second carrier to the user equipment through the first carrier; and transmitting information to the user equipment through the second carrier according to the scheduling information of the second carrier, wherein the determining the current radio frequency support capability of a user equipment comprises:

obtaining information of the current radio frequency support capability of the user equipment, wherein, the information of the current radio frequency support capability comprises:

a bandwidth or frequency range of the current operating frequency band of the user equipment;

at least two sensitive frequency points outside the current operating frequency band of the user equipment; and a radio frequency tuning speed of the user equipment.

12. A device for transmitting information, comprising:

a processor; and a non-transitory memory for storing instructions executable for the processor;

wherein the processor is configured to execute the instructions to thereby realize operations for transmitting information, applied to a user equipment, the operations including:

receiving scheduling information of a second carrier through a first operating frequency band, wherein the scheduling information of the second carrier comprises at least: additional scheduling information of subsequent scheduling;

switching the first operating frequency band to a second operating frequency band according to the additional scheduling information of the subsequent scheduling; and receiving the subsequent scheduling through the second operating frequency band, wherein prior to the receiving the additional scheduling information of the subsequent scheduling of the second carrier through the first operating frequency band, the operations further include:

reporting the information of the radio frequency support capability to a base station, wherein, the information of the current radio frequency support capability comprises:

a bandwidth or frequency range of one operating frequency band;

at least two sensitive frequency points outside the operating frequency band; and the radio frequency tuning speed of the user equipment.

13. The device according to claim 11, wherein the sending scheduling information of the second carrier to the user equipment through the first carrier comprises:

determining additional scheduling information of the subsequent scheduling, wherein the additional scheduling information of the subsequent scheduling comprises: a frequency range of the second carrier, a scheduling time of the second carrier, and a location of scheduling control information of the subsequent scheduling; and sending the additional scheduling information of the subsequent scheduling together with scheduling control information of a current scheduling to the user equipment.

14. The device according to claim 11, wherein the sending scheduling information of the second carrier to the user equipment through the first carrier comprises:

determining the additional scheduling information of the subsequent scheduling, wherein, the additional scheduling information of the subsequent scheduling comprises: a frequency range of the second carrier, a scheduling time of the second carrier, and a location of scheduling control information of the subsequent scheduling;

loading the additional scheduling information of the subsequent scheduling into a pre-configured resource of the first carrier; and sending the additional scheduling information of the subsequent scheduling to the user equipment through the first carrier, after the current scheduling is completed.

15. The device according to claim 11, wherein the sending scheduling information of the second carrier to the user equipment through the first carrier comprises:

determining the additional scheduling information of the subsequent scheduling, wherein, the additional scheduling information of the subsequent scheduling comprises: a frequency range of the second carrier and a scheduling time of the second carrier;

loading the additional scheduling information of the subsequent scheduling and the scheduling control information into the pre-configured resource of the first carrier; and sending the additional scheduling information of the subsequent scheduling and the scheduling control information to the user equipment through the first carrier.

16. The device according to claim 12, wherein the additional scheduling information of the subsequent scheduling is received through the first operating frequency band by at least one of:

obtaining the additional scheduling information of the subsequent scheduling when scheduling control information of the current scheduling is obtained;

obtaining the additional scheduling information of the subsequent scheduling through the first operating frequency band, after reception of the data information of the current scheduling is completed; or receiving the scheduling control information of the subsequent scheduling and the additional scheduling information of the subsequent scheduling through the first operating frequency band, after reception of the data information of the current scheduling is completed.

17. The device according to claim 12, wherein the receiving the subsequent scheduling through the second operating frequency band comprises:

obtaining the scheduling control information and data information of the subsequent scheduling through the second operating frequency band; or obtaining the data information of the subsequent scheduling through the second operating frequency band.

* * * * *